(12) United States Patent
Sears et al.

(10) Patent No.: US 11,067,809 B1
(45) Date of Patent: Jul. 20, 2021

(54) SYSTEMS AND METHODS FOR MINIMIZING EXTERNAL LIGHT LEAKAGE FROM ARTIFICIAL-REALITY DISPLAYS

(71) Applicant: Facebook Technologies, LLC, Menlo Park, CA (US)

(72) Inventors: Jasmine Soria Sears, Kirkland, WA (US); Gareth Valentine, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/524,905

(22) Filed: Jul. 29, 2019

(51) Int. Cl.
*G02B 27/01* (2006.01)
*F21V 8/00* (2006.01)
*G02B 26/04* (2006.01)

(52) U.S. Cl.
CPC ....... *G02B 27/0172* (2013.01); *G02B 6/0031* (2013.01); *G02B 26/04* (2013.01); *G02B 2027/0178* (2013.01)

(58) Field of Classification Search
CPC ... G02B 27/0172; G02B 26/04; G02B 6/0031
See application file for complete search history.

(56) References Cited

U.S. PATENT DOCUMENTS

| | | | | |
|---|---|---|---|---|
| 5,579,161 A * | 11/1996 | Sekiguchi | .......... | G02B 27/0101 359/559 |
| 6,055,110 A * | 4/2000 | Kintz | ................ | G02B 27/0101 359/364 |
| 6,215,532 B1 * | 4/2001 | Takagi | ............... | G02B 27/0101 345/7 |
| 6,396,639 B1 * | 5/2002 | Togino | ............... | G02B 17/0816 359/630 |
| 6,518,939 B1 * | 2/2003 | Kikuchi | .................. | G06F 3/147 345/8 |
| 6,760,169 B2 * | 7/2004 | Takahashi | ................ | G02B 5/04 359/631 |

(Continued)

OTHER PUBLICATIONS

Sears et al., "Apparatus, Systems, and Methods for Display Devices Including Local Dimming", U.S. Appl. No. 16/503,439, filed Jul. 3, 2019, 155 pages.

(Continued)

*Primary Examiner* — Nitin Patel
*Assistant Examiner* — Robert M Stone
(74) *Attorney, Agent, or Firm* — FisherBroyles, LLP

(57) ABSTRACT

The disclosed display system may include (1) a display element that is transparent and includes a first surface facing a viewing region and a second surface opposite the first surface, the second surface facing an external environment, (2) a light-blocking shutter that faces and overlaps at least a portion of the second surface of the display element, (3) a display-driving subsystem that displays images visible to a user at the viewing region via display light emitted from the first surface of the display element during active display intervals, and (4) a shutter-driving subsystem that alternately switches the state of the light-blocking shutter between a blocking state during the active display intervals and a pass-through state during inactive display intervals when the display light is not emitted from the display element. Various other systems, devices, and methods are also disclosed.

17 Claims, 21 Drawing Sheets

(56) References Cited

U.S. PATENT DOCUMENTS

| | | | | |
|---|---|---|---|---|
| 8,687,661 | B2* | 4/2014 | Rosenthal | H01S 3/104 |
| | | | | 372/25 |
| 9,989,767 | B2* | 6/2018 | Dobschal | G02B 27/0172 |
| 10,847,075 | B1* | 11/2020 | Buckley | G09G 3/2003 |
| 2006/0033992 | A1* | 2/2006 | Solomon | H04N 13/363 |
| | | | | 359/462 |
| 2006/0250322 | A1* | 11/2006 | Hall | G02B 27/0172 |
| | | | | 345/8 |
| 2007/0086495 | A1* | 4/2007 | Sprague | H01S 5/06804 |
| | | | | 372/38.02 |
| 2012/0050143 | A1* | 3/2012 | Border | G09G 3/3611 |
| | | | | 345/8 |
| 2012/0062444 | A1* | 3/2012 | Cok | G02B 27/0172 |
| | | | | 345/8 |
| 2012/0119978 | A1* | 5/2012 | Border | G02B 27/0172 |
| | | | | 345/8 |
| 2012/0242716 | A1* | 9/2012 | Tanaka | G09G 3/36 |
| | | | | 345/690 |
| 2013/0127980 | A1* | 5/2013 | Haddick | G02B 27/0093 |
| | | | | 348/14.08 |
| 2013/0285885 | A1* | 10/2013 | Nowatzyk | G02B 27/0172 |
| | | | | 345/8 |
| 2013/0286053 | A1* | 10/2013 | Fleck | G09G 5/377 |
| | | | | 345/690 |
| 2014/0218272 | A1* | 8/2014 | Kikuchi | G09G 3/3258 |
| | | | | 345/77 |
| 2015/0178939 | A1* | 6/2015 | Bradski | G06F 3/017 |
| | | | | 345/633 |
| 2015/0243068 | A1* | 8/2015 | Solomon | H01L 27/156 |
| | | | | 345/419 |
| 2015/0260992 | A1* | 9/2015 | Luttmann | G02B 27/0172 |
| | | | | 359/631 |
| 2016/0154244 | A1* | 6/2016 | Border | G02B 27/0176 |
| | | | | 359/630 |
| 2016/0187666 | A1* | 6/2016 | Manns | G02B 27/017 |
| | | | | 359/479 |
| 2016/0320620 | A1* | 11/2016 | Maimone | G02B 27/0179 |
| 2016/0360074 | A1* | 12/2016 | Winer | H04N 5/2256 |
| 2017/0032729 | A1* | 2/2017 | Moldvai | G02B 27/0172 |
| 2017/0115395 | A1* | 4/2017 | Grauer | G01S 17/18 |
| 2017/0192237 | A1* | 7/2017 | Dobschal | G02B 27/0172 |
| 2017/0199396 | A1* | 7/2017 | Knoll | A61B 3/113 |
| 2017/0256095 | A1* | 9/2017 | Bani-Hashemi | G02B 27/0101 |
| 2017/0323615 | A1* | 11/2017 | Hazra | G09G 3/002 |
| 2018/0182354 | A1* | 6/2018 | Radhakrishnan | G09G 3/2018 |
| 2018/0286320 | A1* | 10/2018 | Tardif | G09G 3/025 |
| 2018/0348524 | A1* | 12/2018 | Blum | H01L 51/5275 |
| 2019/0041642 | A1* | 2/2019 | Haddick | G06F 1/163 |
| 2019/0227321 | A1* | 7/2019 | Lee | G02B 5/1809 |
| 2019/0265476 | A1* | 8/2019 | Blum | G02B 3/0006 |
| 2019/0273911 | A1* | 9/2019 | Perreault | H04N 13/332 |
| 2019/0372306 | A1* | 12/2019 | Reidy | G02B 6/0016 |
| 2020/0029032 | A1* | 1/2020 | Mahara | G01S 17/894 |
| 2020/0051483 | A1* | 2/2020 | Buckley | G09G 3/32 |
| 2020/0158943 | A1* | 5/2020 | Calafiore | G02B 5/1857 |

OTHER PUBLICATIONS

Sears et al., "Apparatus, Systems, and Methods for Display Devices Including Local Dimming", U.S. Appl. No. 16/503,440, filed Jul. 3, 2019, 156 pages.

Sharma et al., "Switchable Electroactive Devices for Head-Mounted Displays", U.S. Appl. No. 16/351,477, filed Mar. 12, 2019, 108 pages.

Sztuk et al., "Systems and Methods for Selectively Augmenting Artificial-Reality Experiences with Views of Real-World Environments", U.S. Appl. No. 16/403,646, filed May 6, 2019, 103 pages.

Kress, Bernard, "Diffractive and holographic optics as combiners in Head Mounted Displays", International Symposium on Wearable Computers, 2013, 73 pages.

Kress et al., "Diffractive and Holographic Optics as Optical Combiners in Head Mounted Displays", Session: Wearable Systems for Industrial Augmented Reality Applications, UbiComp, Sep. 8-12, 2013, pp. 1479-1482.

Bohn, Dieter, "Intel made smart glasses that look normal", URL: https://www.theverge.com/2018/2/5/16966530/intel-vaunt-smart-glasses-announced-ar-video, Feb. 5, 2018, pp. 1-20.

LEDs Magazine, "Pulse-driven LEDs have higher apparent brightness", URL: https://www.ledsmagazine.com/home/article/16698062/pulsedriven-leds-have-higher-apparent-brightness, May 5, 2008, pp. 1-8.

* cited by examiner

Spiropyran                    Merocyanines

SYSTEMS AND METHODS FOR MINIMIZING EXTERNAL LIGHT LEAKAGE FROM ARTIFICIAL-REALITY DISPLAYS

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
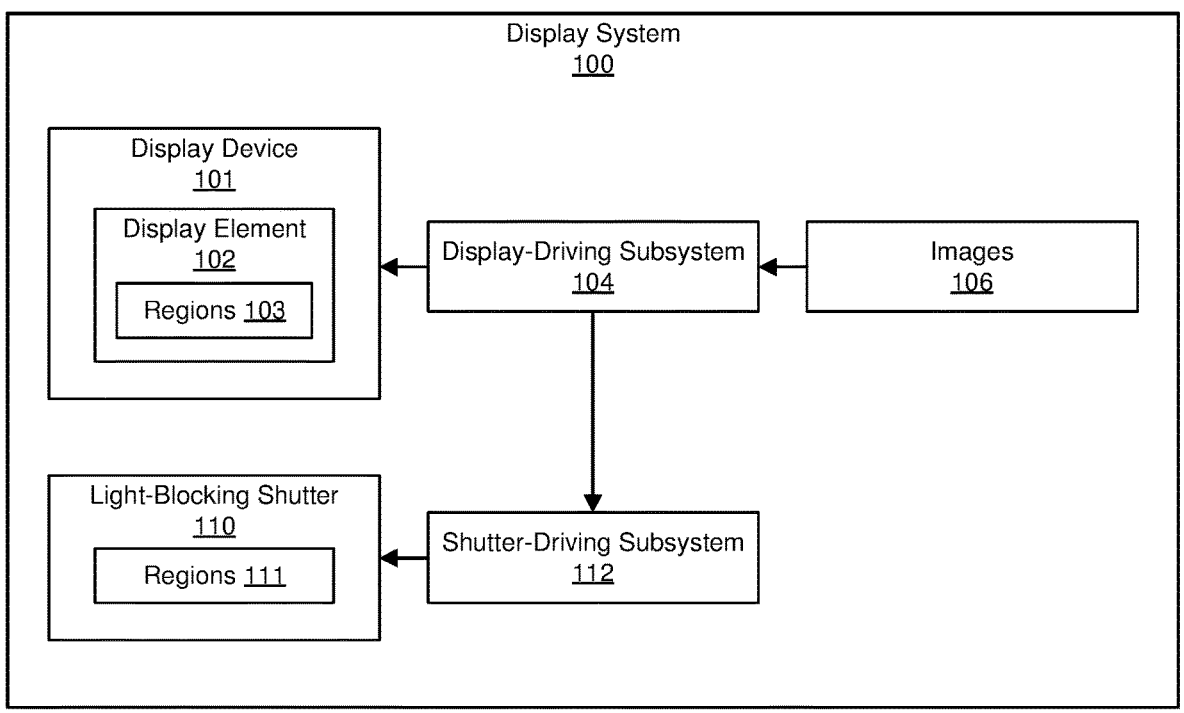
FIG. 1 is a block diagram of an exemplary display system for minimizing external light leakage from artificial-reality displays according to some embodiments of this disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for minimizing external light leakage from artificial-reality displays. Artificial-reality systems are widely gaining in popularity for use in a growing number of activities. For example, artificial-reality systems (including augmented-reality, mixed-reality, and virtual-reality devices, such as headsets) may enable users to experience events, such as interactions with people in a computer-generated simulation of a three-dimensional world or viewing images superimposed on a real-world view. Such devices and headsets are also commonly used for purposes other than recreation. For example, governments may use such devices for military training, medical professionals may use the devices to simulate surgery, and engineers may use such devices as design visualization aids.

Artificial-reality systems may enable users to have immersive or semi-immersive experiences in which digital display elements block or obscure all or a substantial portion of a user's view of his or her real-world environment. Some augmented-reality systems produce electronically-generated image elements that are overlaid on a user's view of his or her real-world environment. Additionally, in mixed-reality and virtual-reality systems, different portions of a captured scene or an artificially-generated scene may be displayed to a user.

Augmented-reality and mixed-reality headsets often include optical see-through displays that transmit light from a user's ambient environment to the user's eyes such that their surroundings are visible. At the same time, various image elements may be displayed to the user to form a composite image. Undesirably, such headsets may display images that are visible, not only to the user, but often to other individuals as well. While headsets, such as augmented-reality glasses, have become more compact and convenient for wearers, such devices may inadvertently leak display light externally so as to be visible to other individuals. For example, augmented-reality glasses may display images to a user via transparent display elements in the lenses that also leak light into the external environment. Additionally, light from the display elements may be undesirably visible on a portion of a user's face, such as the user's eyes. Such leaked light may be visually unpleasing or distracting to other observers and may be considered socially unacceptable in many contexts. Additionally, if the displayed content is visible to others, the light leakage may pose a privacy or security issue to users.

As will be explained in greater detail below, the systems and methods disclosed herein may effectively mitigate the undesirable leakage of display light from artificial-reality devices while maintaining the transparency of optical see-through display elements essential to the effective operation of such devices. Embodiments of the present disclosure may have one or more advantages over conventional artificial-reality systems, such as augmented-reality and mixed-reality systems. For example, by utilizing a light-blocking shutter in combination with a light-emitting display element that produces images via short pulses of light, the amount of light escaping into the user's surroundings may be effectively reduced. While such a light-blocking shutter may be disposed in the field of view of both a head-mounted display wearer and other individuals in the wearer's environment, it may be made unnoticeable by running such a shutter at a short duty cycle corresponding to that of the display element. For example, a light-blocking shutter may be driven to block light from at least a portion of the display area in conjunction with emission of light from the display element. Thus, while the light-blocking member may temporarily block light from passing through, for example, the lens region of an augmented-reality headset, the lenses may still appear to be transparent during use since, during the majority of the viewing time, the light-blocking shutter is not activated and does not block the passage of light therethrough. Conversely, while the display element may be driven in short pulses while remaining in an off state between such pulses for the majority of the time, the emitted light may still be apparent to the wearer and may be viewed as a continuous image while light is nonetheless blocked to the view of external observers by the light-blocking shutter. Additionally, since the light-blocking shutter is driven at the same time that the light-emitting element displays an image, the contrast and visibility of the image may be enhanced from the wearer's perspective and may increase the perceived brightness of the display images.

The following will provide, with reference to FIGS. 1-21, detailed descriptions of various artificial-reality display systems and methods that minimize undesirable light leakage while enhancing display image quality for users.

FIG. 1 is a block diagram of an exemplary display system 100 that may present one or more images 106 to a user via a display element 102 of a display device 101. In some examples, display system 100 may operate in a virtual reality system environment, an augmented reality system environment, a mixed reality system environment, or some combination thereof. In some examples, some or all of display system 100 may be included in a head-mounted display device (such as those illustrated in FIGS. 7, 16, and 19-21).

As shown, display system 100 may include a display-driving subsystem 104 (e.g., a display driver) that presents, via display element 102, a variety of content to a user, including virtual views of an artificially rendered virtual-world environment and/or augmented views of a physical, real-world environment. In some examples, the augmented views may be augmented with computer-generated elements (e.g., two-dimensional (2D) or three-dimensional (3D) images, 2D or 3D video, sound, etc.). In some examples, images 106 may convey a scene (e.g., a captured scene, an artificially-generated scene, an evolving artificial-reality environment, or a combination of the same) to the user.

In various embodiments, display element 102 may include a single electronic display or multiple electronic displays (e.g., a display for each eye of a user). Examples of display element 102 may include a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a waveguide display, a digital light processing (DLP) display, a microLED display, a liquid crystal on silicon (LCOS) display, a ferroelectric liquid crystal on silicon (fLCOS) display, or another suitable transparent display, or some combination thereof. As shown, display element 102 may include a plurality of display regions 103 (e.g., pixels or subpixels) that are individually controllable. In some examples, each of display regions 103 may be transparent or partially transparent, at least when not displaying an image or video, such that ambient light from a user's real-world environment is able to pass through the display region.

As shown in FIG. 1, display system 100 may include a pass-through subsystem for controlling a light-blocking shutter 110 capable of selectively blocking ambient light emitted by or reflected by objects in a real-world environment from reaching a user's eye. Light-blocking shutter 110 may have a variety of forms. For example, light-blocking shutter 110 may form or be integrated into the lens or lenses of a head-mounted display device. In other examples, light-blocking shutter 110 may form a layer of an otherwise transparent display or housing of a head-mounted display device.

Light-blocking shutter 110 may include a plurality of blocking regions 111 that are individually addressable and switchable between at least a blocking state (e.g., an opaque state or a shuttered state) in which light is blocked from passing through the region and a pass-through state (e.g., a transparent state or an un-shuttered state) in which light is allowed to pass through the region. In some examples, each of blocking regions 111 may be oriented relative to a corresponding one or more of display regions 103, such that, when in a blocking state, the blocking region blocks light from reaching or passing through a corresponding display region. In some embodiments, light-blocking shutter 110 may be a liquid crystal layer that is divided into regular or irregular regions that can be independently turned dark or clear. Light-blocking shutter 110 may use any appropriate approach for blocking or transmitting light, including e-inks, reflective devices such as MEMS mirrors or thin film liquid crystal switchable mirrors, photochromic materials, electrochromic elements, switchable scattering materials and the like. For example, spatially selective electric field application to an electrochromic layer may be used to achieve localized light blocking or transmittance. The light blocking effect may be achieved by switchable reflectivity, absorption, or scattering of the light and may involve polarization imparting elements (e.g., an absorbing linear polarizing film in addition to the switchable shutter).

In at least one embodiment, each of blocking regions 111 of light-blocking shutter 110 may be an optical shutter (e.g., a liquid-crystal shutter or mechanical shutter) capable of blocking or controlling light transmittance. An optical shutter may have pixels that have dark or light states. In a dark state, the pixel may be generally opaque and block light from a portion of the local environment from reaching the user's view. In a light state, the pixel may be relatively transparent, allowing light from the local environment to pass through the pixel and reach the user's view. In some examples, a blocking element may include pixels with multiple available state options (for example, clear/dim/opaque or clear/variable dimness). For example, an optical shutter, such as a liquid crystal shutter, may have pixels that have at least one gray state in addition to the dark and light states.

In some embodiments, light-blocking shutter 110 may include guest-host liquid crystal shutters that include, for example, a liquid crystal layer (such as a nematic liquid crystal) incorporating a dye (e.g., including dye molecules oriented within a nematic liquid crystal). In some embodiments, a nematic liquid crystal molecule may include a dye moiety. In some embodiments, a liquid crystal layer may include a polymer dispersed liquid crystal (PDLC, where the liquid crystal may be a nematic liquid crystal) or a polymer-stabilized liquid crystal, such as a polymer stabilized cholesteric texture.

Figure 2A:
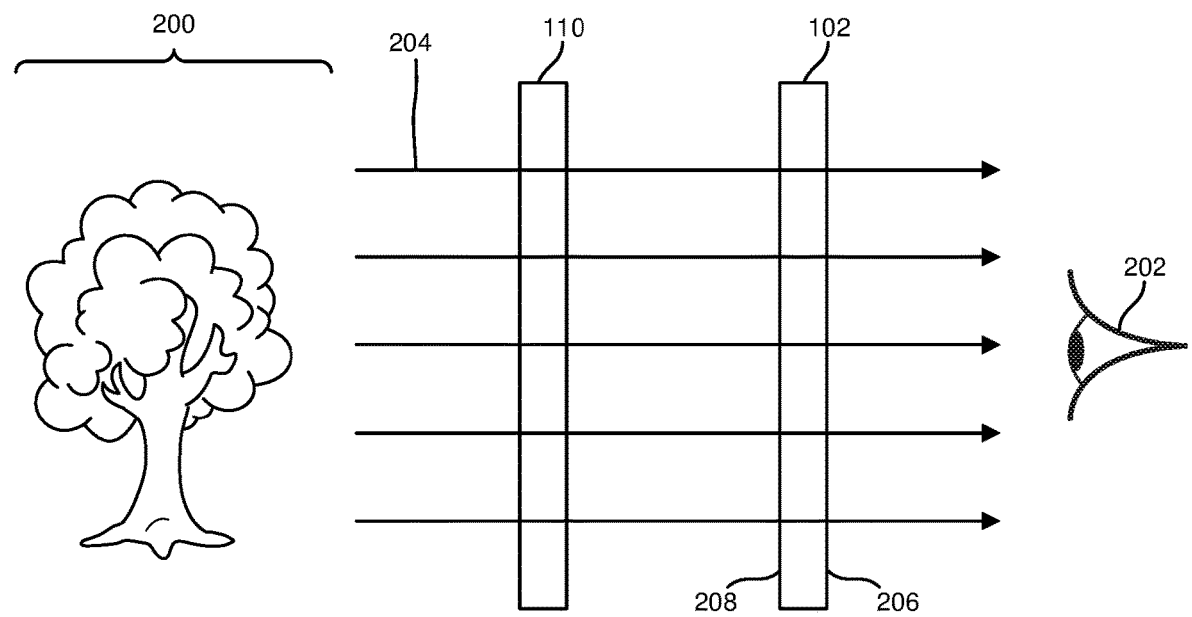
FIG. 2A illustrates a light-blocking shutter in a pass-through state according to some embodiments of this disclosure.
Figure 2B:
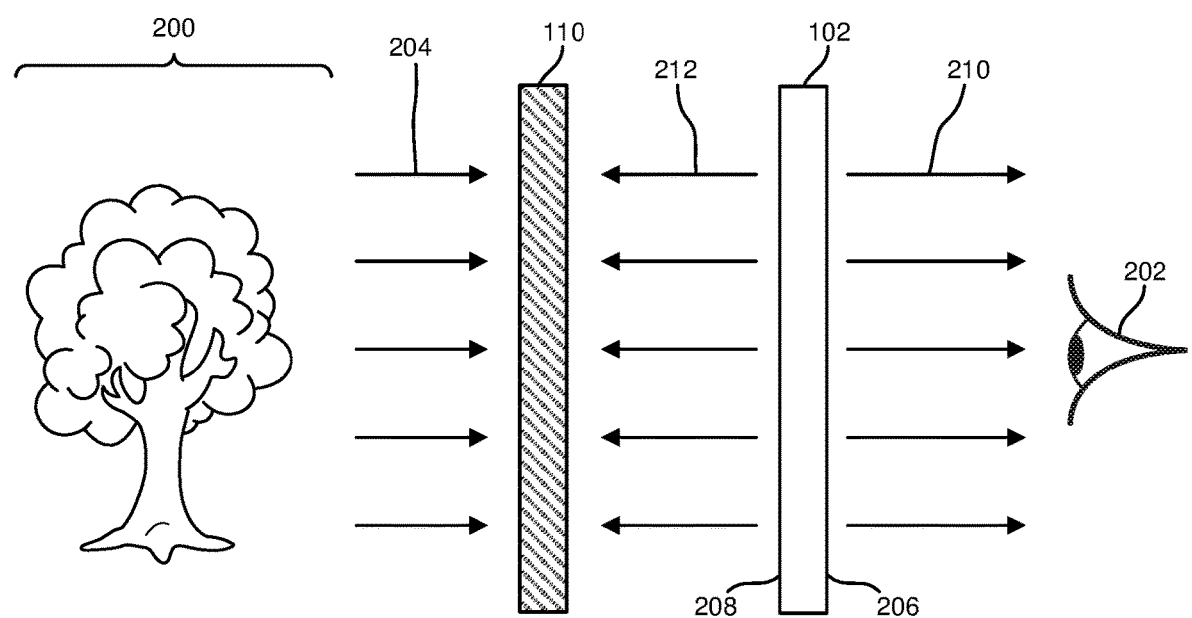
FIG. 2B illustrates a light-blocking shutter in a light-blocking state according to some embodiments of this disclosure.

FIGS. 2A and 2B illustrate elements of system 100, including a light-blocking shutter 110 and a display element 102 for a user's eye 202, disposed in a real-world environment 200. As shown in these figures, light-blocking shutter 110 may overlap at least a portion of display element 102 so as to block passage of light from display element 102 into real-world environment 200. Display element 102 may include any suitable type of optical element suitable for directing light forming a visible displayed image towards a user's eye. For example, display element 102 may include a waveguide or a combiner (e.g., a holographic combiner) configured to direct light generated by a light-emitting array towards a user's eye 202 while also permitting passage of light from real-world environment 200 to the user's eye 202. Display element 102 may include a first surface 206 facing a viewing region at which the user's eye 202 is while wearing display system 100. Additionally, display element 102 may include a second surface 208 opposite the first surface 206. Light blocking shutter 110 may face second surface 208 and may overlap at least a portion of the second surface 208 of display element 102. Light-blocking shutter 110 and display element 102 may be disposed in close proximity to each other and, in some embodiments, may be spaced apart. In at least one embodiment, light-blocking shutter 110 and display element 102 may be combined in into a single optical component, such as a lens component of a pair of augmented-reality glasses, in separate layers thereof. Light-blocking shutter 110 may include any suitable type of light-blocking device suitable for preventing passage of light from display element 102 towards real-world environment 200, as will be described in greater detail below. In some examples, light-blocking shutter 110 may be driven by shutter-driving subsystem 112 at a relatively fast rate so as to be turned on and off at the same or a harmonic frequency as a refresh rate or frame rate as display device 101 that includes display element 102.

FIG. 2A illustrates light-blocking shutter 110 in a pass-through state in which the light-blocking shutter 110 is transparent or substantially transparent. As shown in FIG. 2A, ambient light 204 from real-world environment 200 may be transmitted through light-blocking shutter 110. In some embodiments, light-blocking shutter 110 may be maintained in the pass-through state a majority of the time, with light-blocking shutter 110 being switched to a light-blocking state during selected periods corresponding to activation of display element 102. As shown in FIG. 2A, display element 102 may not emit light during a timeframe in which the light-blocking shutter 110 is in the pass-through state. Accordingly, ambient light 204 may reach user's eye 202 such that the user is able to see real-world environment 200 in their field of view through display element 102. Although image light is not displayed during the period illustrated in FIG. 2A, the user may nonetheless perceive a displayed image overlaid on at least a portion of real-world environment 200.

FIG. 2B illustrates light-blocking shutter 110 in a light-blocking state in which light transmission through the light-blocking shutter 110 is blocked. As shown in this figure, ambient light 204 from real-world environment 200 may be blocked from passing through light-blocking shutter 110. Additionally, light-blocking shutter 110 may block light emitted by display element 102 from passing through the light-blocking shutter 110 to real-world environment 200, where such light may be otherwise visible to external viewers. In some examples, a shutter-driving subsystem may control light-blocking shutter 110 such that at least a portion of light-blocking shutter 110 is switched to prevent passage of a substantial portion of light therethrough. For example, light-blocking shutter 110 may include a material that may be switched in one or more separate regions or over the entirety of light blocking shutter 110 so as to absorb, reflect, diffract and/or otherwise prevent passage of light. In some examples, light-blocking shutter 110 may allow passage of some light while blocking passage of a significant portion of light incident on light-blocking regions. While light-blocking shutter 110 is in the blocking state, display-driving subsystem 104 may display images visible to user's eye 202 via display light 210 emitted from first surface 206. Additional light 212 may also be emitted from the second surface 208 of display element 102 towards real-world environment 200. In some examples, additional light 212 may include light reflected off of user's eye 202 and/or other portions of the user's face. Light-blocking shutter 110 may block such additional light 212 such that it is prevented or inhibited from passing through light-blocking shutter 110 into real-world environment 200.

Figure 3A:
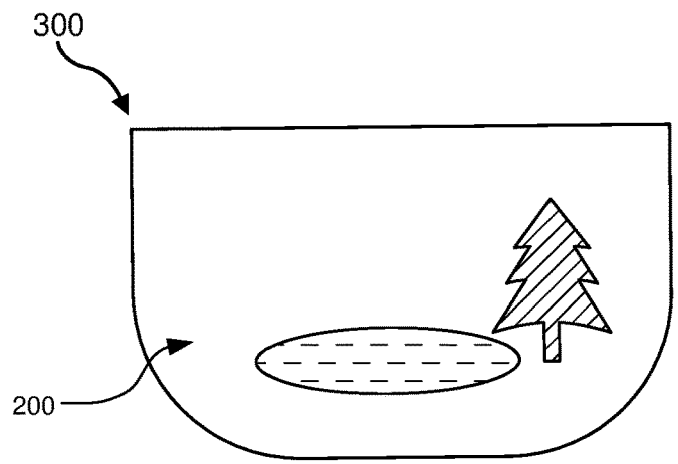
FIGS. 3A-3C illustrate views visible at the location of a user's eye in FIGS. 2A and 2B according to some embodiments of this disclosure.
Figure 3B:
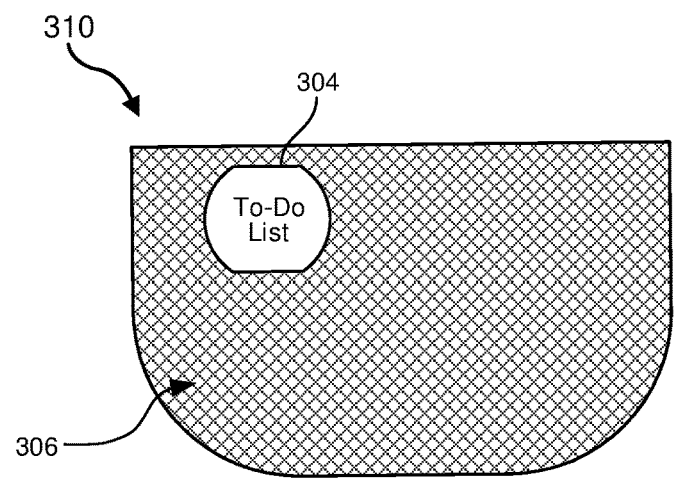
Figure 3C:
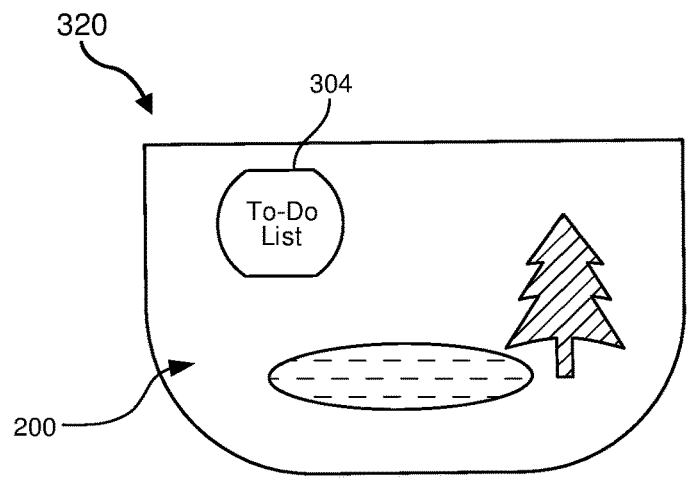

FIGS. 3A-3C illustrate views visible at the location of user's eye 202 shown in FIGS. 2A and 2B. FIG. 3A represents a field of view 300 presented to the user's eye 202 when light-blocking shutter 110 is in the pass-through state, as shown in FIG. 2A. Real-world environment 200 may be visible due to transmission of ambient light 204 through light-blocking shutter 110 and display element 102, as illustrated in FIG. 3A.

FIG. 3B illustrates a field of view 310 presented to user's eye 202 when the light-blocking shutter 110 is in the blocking state shown in FIG. 2B. For example, shutter-driving subsystem 112 may display a displayed object 304, such as a message or other suitable image object, via a portion of display element 102. Additionally, during display of the displayed object 304, light-blocking shutter 110 may block transmission of ambient light 204 such that, aside from displayed object 304, the field of view 310 includes blocked view 306 (which is essentially a view of light-blocking shutter 110).

Figure 4A:
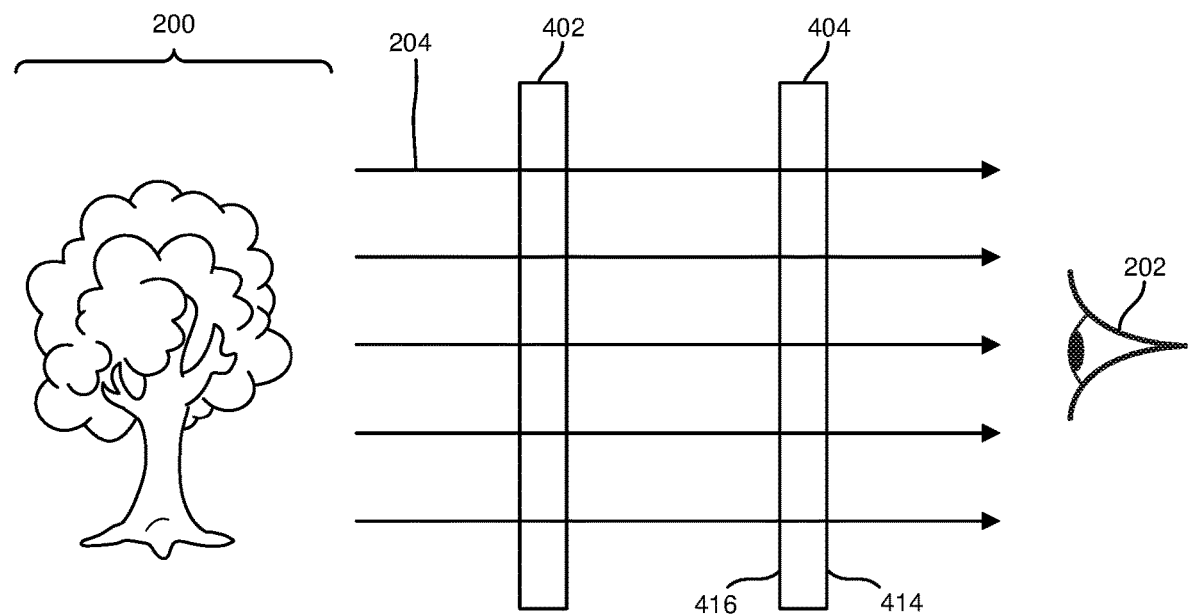
FIGS. 4A and 4B illustrate an exemplary use of light-blocking shutters according to some embodiments.
Figure 4B:
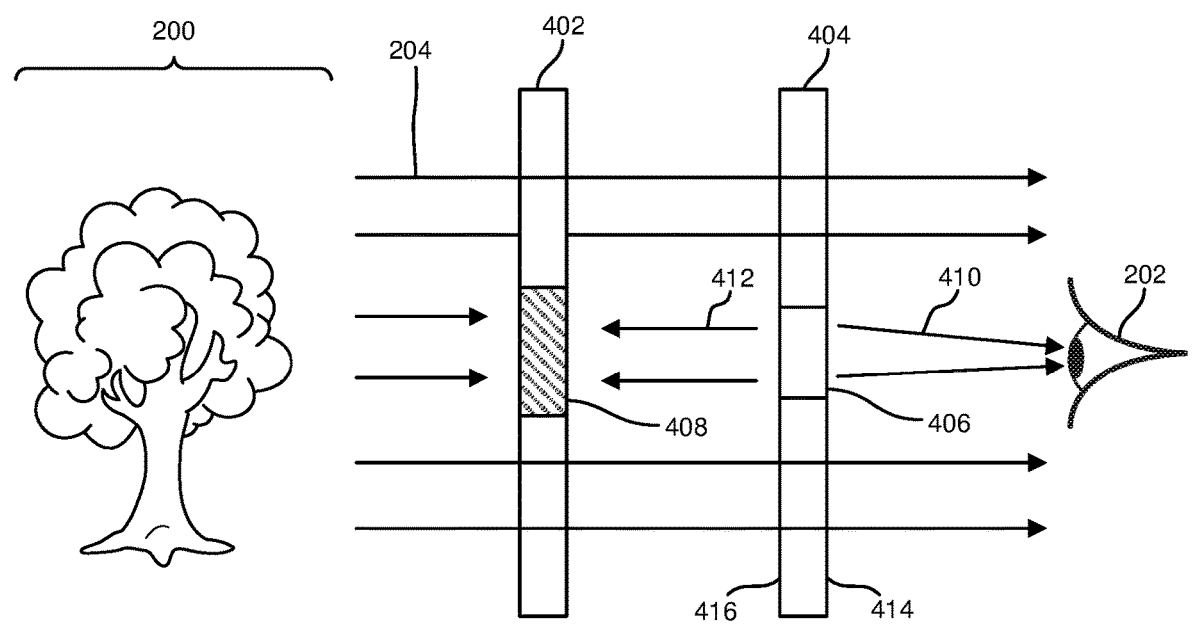

FIG. 3C illustrates a field of view 320, representing a view that is perceived by the user. As illustrated, the user may see displayed object 304 overlaid on real-world environment 200. However, due to the nature of the human eye and principles governing how images are perceived by the user, the blocked view 306 shown in FIG. 3B may not be perceived by the user, while the displayed object 304 presented during that same timeframe may be detected by user's eye 202 in his or her field of view. This is made possible by the fact that the light-blocking shutter 110 may only block ambient light 204 for a small proportion of the overall timeframe (i.e., the light-blocking shutter 110 may be driven at a low duty cycle). Additionally, although display light 210 forming displayed object 504 may be emitted by display element 404 for an even shorter proportion of the viewing time, the user may nonetheless perceive the emitted light as a displayed image. This may be due to an effect whereby the human eye may perceive a short-cycle pulsed image as being significantly brighter than an image that is driven for a much longer period by a direct voltage. For example, a short-cycle pulse voltage applied to a light-emitting display with a frequency of approximately 60 Hz and a duty ratio of less than 10% (e.g., approximately 5%) may appear to the user's eye to be approximately double the brightness of a light emitting display driven by a direct voltage having a duty ratio of about 100%. This enhanced apparent brightness perceived by the user may be due to a principle known as the Broca-Sulzer effect, whereby light looks several times brighter to the user's eye than it is in reality when exposed to a spark of light, such as a camera flash. Accordingly, the visibility of the light-blocking shutter 110 may be minimized from the perspective of the wearer, while conversely, the appearance of the displayed object 304 may be enhanced by synchronously driving both the light-blocking shutter 110 and the display element 102 at sufficiently low duty ratios. In some examples, the light-blocking shutter 110 may operate at the same or a harmonic frequency as the display element 102. In some examples, the light-blocking shutter 110 and/or the display element 102 may be driven at a frequency of from about 60 Hz to 2000 Hz According to some embodiments, light emitted by a display element may be sufficiently blocked by obscuring only a portion of a region overlapping the display element. FIGS. 4A and 4B, for example, illustrate an exemplary light-blocking shutter 402 that blocks light in only a region overlapping a corresponding region of display element 404. Display element 404 may, for example, be part of a display device that utilizes a projector and an optical combiner, such as a holographic combiner, to direct light from a small region of a display element 404 into a user's eye. For example, the display device may include an eye-tracking system that tracks the location and orientation of user's eye 202, utilizing such information to modify the direction of light projected from a first surface 414 of display element 404 so as to direct the light into the pupil of user's eye 202. Accordingly, light may not be projected from the whole display region of display element 404. Rather, at a given time, light may be projected from a display region 406 based on the position of user's eye 202.

Because the light beam may not be projected from regions outside of display region 406, the light leakage may be effectively blocked by obscuring a limited region overlapping display region 406 and a region extending around display region 406, while still allowing light to pass through other portions of the display element 404. For example, as shown in FIG. 4B, light-blocking shutter 402 may overlap second surface 416 of display element 404. Light-blocking shutter 402 may block light only at light-blocking region 408, which overlaps display region 406 and, in some examples, the region surrounding display region 406. Accordingly, ambient light 204 may be allowed to pass through light-blocking shutter 402 in regions outside of light-blocking region 408 while the display element 404 displays an image to user's eye 202. As illustrated, display element 404 may project display light 410 from display region 406 toward the pupil of user's eye 202. Additionally, additional light 412 may be emitted from second surface 416 of display element 404, and this additional light 412 may be blocked by light-blocking region 408 of light-blocking shutter 402.

In some embodiments, light-blocking region 408 may additionally or alternatively be positioned to block light reflected from a portion of user's eye 202 such that the light spot is not visible to external users. Light-blocking shutter 402 may be configured to only block light at light-blocking region 408. In additional embodiments, light-blocking shutter 402 may be capable of blocking light from other regions outside of light-blocking region 408 such that as the user moves their eye, which may result in a change in the position of the display region of display element 404 (e.g., in response to the detected movement of user's eye 202 by an eye-tracking system), then the portion of light-blocking shutter 402 that is blocked may be shifted correspondingly. Additionally, in some embodiments, the one or more portions of light-blocking shutter 402 may be blocked based on detected positions of external viewers (e.g., based on detection by external sensors of the system). In at least one example, portions of light-blocking shutter 402 that block light may additionally or alternatively be determined based on a position or orientation of the wearer's head so as to ensure that light from display element 404 is not visible.

Figure 5A:
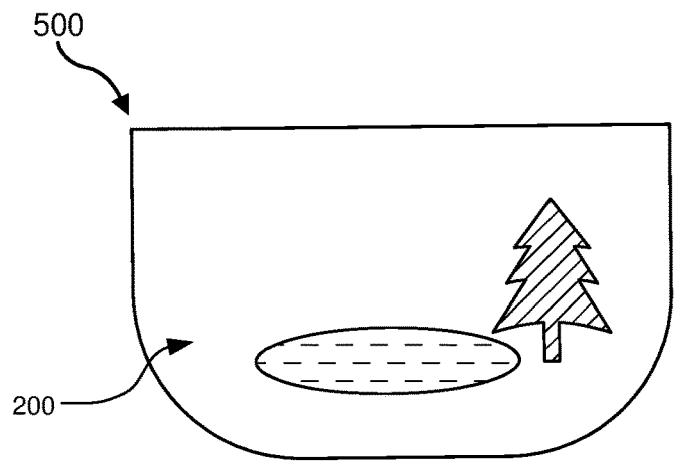
FIGS. 5A-5C illustrate views visible at the location of a user's eye in FIGS. 4A and 4B according to some embodiments.
Figure 5B:
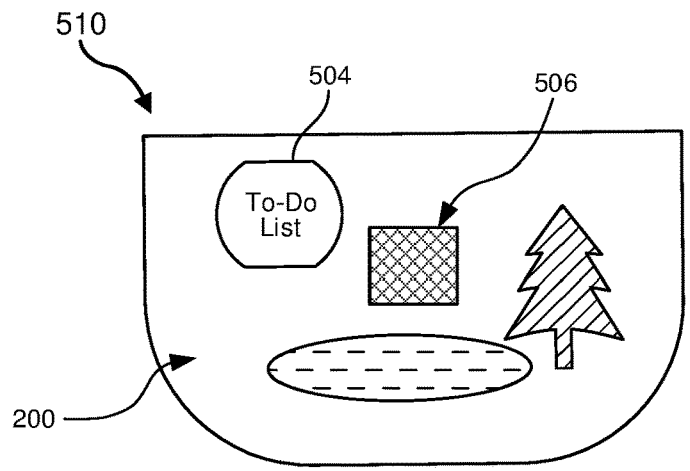
Figure 5C:
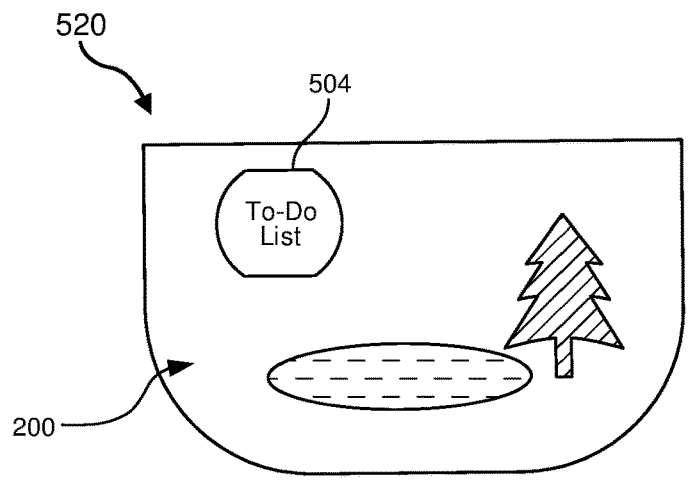

FIGS. 5A-5C illustrate views visible at the location of user's eye 202 shown in FIGS. 4A and 4B. FIG. 5A represents a field of view 500 presented to the user's eye 202 when light-blocking shutter 402 is in the pass-through state shown in FIG. 4A. As illustrated, real-world environment 200 may be visible due to transmission of ambient light 204 through light-blocking shutter 402 and display element 404.

FIG. 5B illustrates a field of view 510 presented to user's eye 202 when the light-blocking shutter 402 is in the blocking state shown in FIG. 4B. For example, display-driving subsystem 104 may display a displayed object 504, such as a message or other suitable image object, via a portion of display element 404. Additionally, during display of the displayed object 504, light-blocking shutter 402 may block transmission of ambient light 204 in a selected portion of the light-blocking shutter 402 corresponding to light-blocking region 408 while allowing passage of light through other regions of light-blocking shutter 402 such that, aside from displayed object 504, the field of view 510 includes blocked-view region 506. The displayed object 504, which is formed by light emitted from display region 406 and directly focused on the user's pupil, may, in various examples, appear to the wearer to be outside the blocked view-region 506 due to the different manner in which ambient light 204 and display light 410 are presented to the user's eye.

FIG. 5C illustrates a field of view 520 representing an overall view that is perceived by the user. As illustrated, the user may see displayed object 504 overlaid on real-world environment 200. Additionally, the blocked view 506 shown in FIG. 5B may not be perceived by the user due to the short interval of time that light-blocking shutter 402 is driven and/or due to the smaller area occupied by the light-blocking region 408 of light-blocking shutter, while the displayed object 504 presented during that same timeframe may be detected by user's eye 202 in his or her field of view 520. Accordingly, the visibility of light-blocking region 408 of the light-blocking shutter 402 may be minimized from the perspective of the wearer, while conversely, the appearance of the displayed object 504 may be enhanced by synchronously driving both the light-blocking shutter 402 and the display element 404 at sufficiently low duty ratios.

Figure 6A:
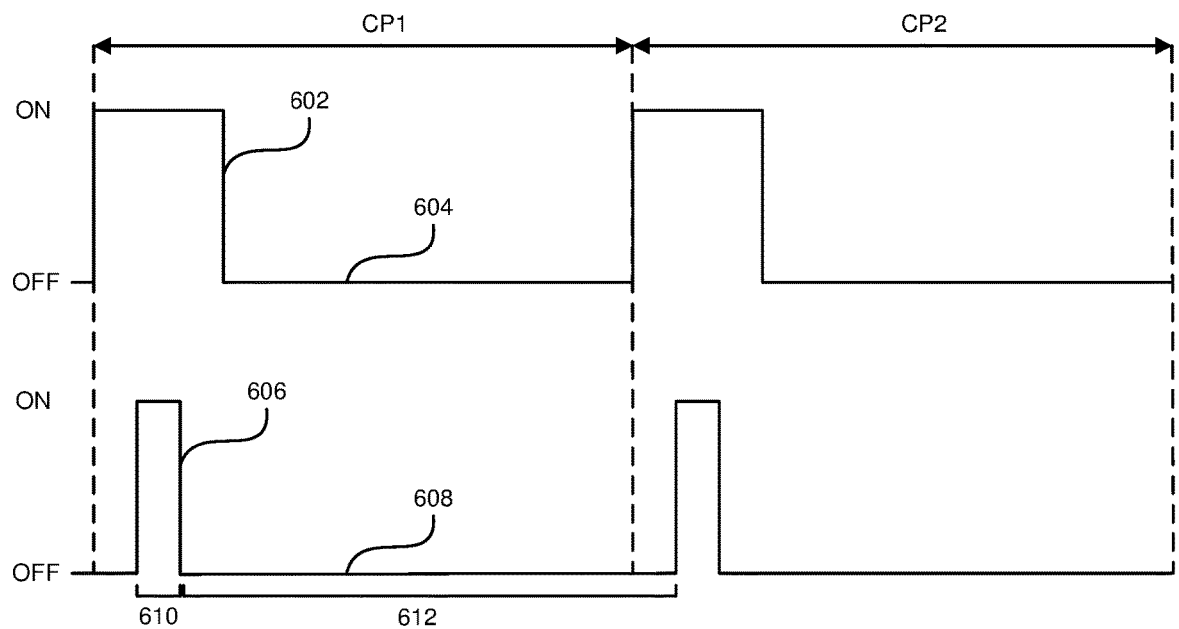
FIGS. 6A and 6B show diagrams of the timing of exemplary driving signals applied to light-blocking shutters and display elements according to some embodiments.
Figure 6B:
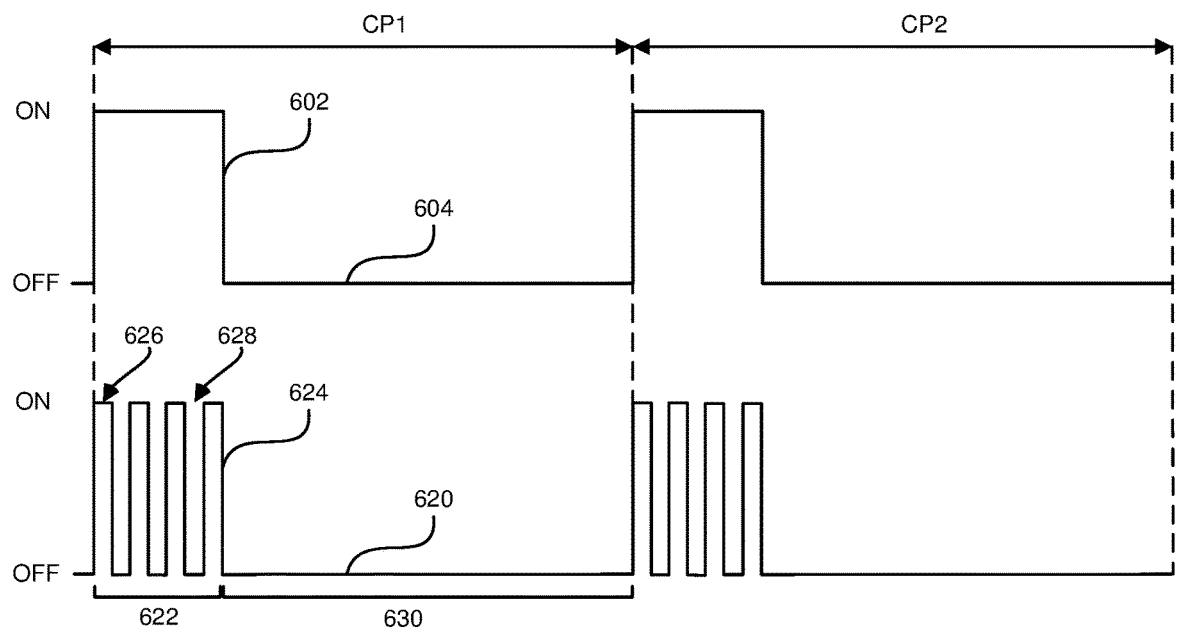

FIGS. 6A and 6B show diagrams illustrating the timing of exemplary driving signals applied to light-blocking shutters and display elements, in accordance with various embodiments. For example, a light-blocking shutter driving waveform 604 may be applied by a shutter-driving subsystem (e.g., shutter-driving subsystem 112 in FIG. 1). Additionally, a display driving waveform 608 may be synchronously applied by a display-driving subsystem (e.g., display-driving subsystem 104 in FIG. 1). A light-blocking shutter (e.g., light-blocking shutter 110 in FIG. 2B) may be driven to block light when driving waveform 604 is in an ON state (i.e., an active state). Additionally, a display element of a display device (e.g., display element 102 in FIGS. 2A and 2B) may be driven to emit display light for forming an image to a user's eye when driving waveform 608 is in an ON state (i.e., an active state). The display element 102 may generate the emitted light or may reflect or direct light emitted by a projector or other laser or other light-emitting source of a display device.

The shutter driving waveform 604 and display driving waveform 608 may be driven in the active state for small proportions of each cycle and may be driven according to a repeating waveform, with cycle periods CP1 and CP2 being illustrated in FIGS. 6A and 6B. For example, display driving waveform 608 may be driven during an active display interval 610 and may be in an inactive or OFF state during inactive display interval 612, with these intervals repeating during each cycle period. As illustrated in FIG. 6A, display driving waveform 608 may have a display pulse 606 that is applied during the active display interval and which may occupy the entire active display interval 610. Additionally, shutter driving waveform 604 may be driven during the active display interval 610 such that the light-blocking shutter blocks light emitted by a display element during this time. As illustrated, driving waveform 604 may include a shutter pulse 602 that is driven during the entirety of the active display interval 610. This shutter pulse 602 may, in some embodiments, overlap the active display interval 610 entirely or may occur over a substantial portion of the active display interval 610 or extend substantially beyond the display interval 610 and may in some cases extend over the entire cycle period CP1.

Additionally, as shown in FIG. 6A, shutter pulse 602 may begin prior to and/or end following the active display interval 610 such that the shutter blocks light during the entirety of display pulse 606. As such, the shutter pulse 602 may include a portion of an inactive display interval 612 occurring prior to and/or following active display interval 610. This ensures that light is blocked and may be necessary in situations where the time taken for the shutter to achieve the blocking state is slower than the turn-on time of the display element. By way of example, cycle period CP1 may be a total of 10 milliseconds. During the second period, display pulse 606 may occupy 1 milliseconds and shutter pulse 602 may occupy 1.6 milliseconds overlapping that of the display pulse 606. The active display interval 610, and likewise the display pulse 606, may have a duration of from approximately 0.1% to approximately 50% of the total duration of each cycle period. The shutter pulse 602 may be active for a duration sufficient to block light emitted during display pulse 606, and as described, shutter pulse 602 may be active for a longer proportion of cycle period CP1 and/or CP2 than display pulse 606. Shutter pulse 602 may have any suitable duration, and in various situations, shutter pulse 602 may, for example, extend for a duration of approximately half a cycle period or the entirety of a cycle period (e.g., to enhance visibility of displayed image elements in at least a portion of the display area, etc.).

In an embodiment, the timing of the display pulse 606 and the shutter pulse 602 will be controlled by the display-driving subsystem 104 with the shutter-driving subsystem 112 providing the necessary voltage/AC signal to control the light-blocking shutter 110 (see FIGS. 1 and 6A). In this way, a precise synchronization between the display pulse 606 and the shutter pulse 602 can be maintained by the display system 100, including any necessary timing delays to the display pulse 606 and extensions to the shutter pulse 602.

In some embodiments, the duration of each display pulse 606 may vary in each cycle period (CP1, CP2, etc.). Similarly, the duration of each shutter pulse 602 may vary in each cycle period.

FIG. 6B shows an additional example where a light-blocking shutter is driven with one active pulse (i.e., shutter pulse 602) during each cycle period. However, in contrast to the waveform illustrated in FIG. 6A, the display element may be driven to display an image using a display-driving waveform 620 having multiple separate pulses that are applied during a pulsed sub-period 622. For example, pulsed sub-period 622 may include multiple shutter pulses 624 that are applied during active display intervals 626. Each of the active display intervals 626 may be separated by inactive display intervals 628, during which the waveform is in the OFF state. Following the pulsed sub-period 622, an extended OFF sub-period 630 may occupy the duration of each cycle period. During this OFF sub-period 630, an extended inactive display interval may be applied to waveform 620. In this example, the pulsed sub-period may have a duration of approximately 0.00001% to approximately 30% of the total duration of the cycle period. In an illustrative example, each of cycle period CP1 and cycle period CP2 may have a duration of 10 milliseconds and the pulsed sub-period 622 may extend for a duration of 1.75 milliseconds with each of the active display intervals 626 and the inactive display intervals 628 having a respective duration of 250 microseconds. In this example, the OFF sub-period may have a duration of 8.25 milliseconds.

Figure 7:
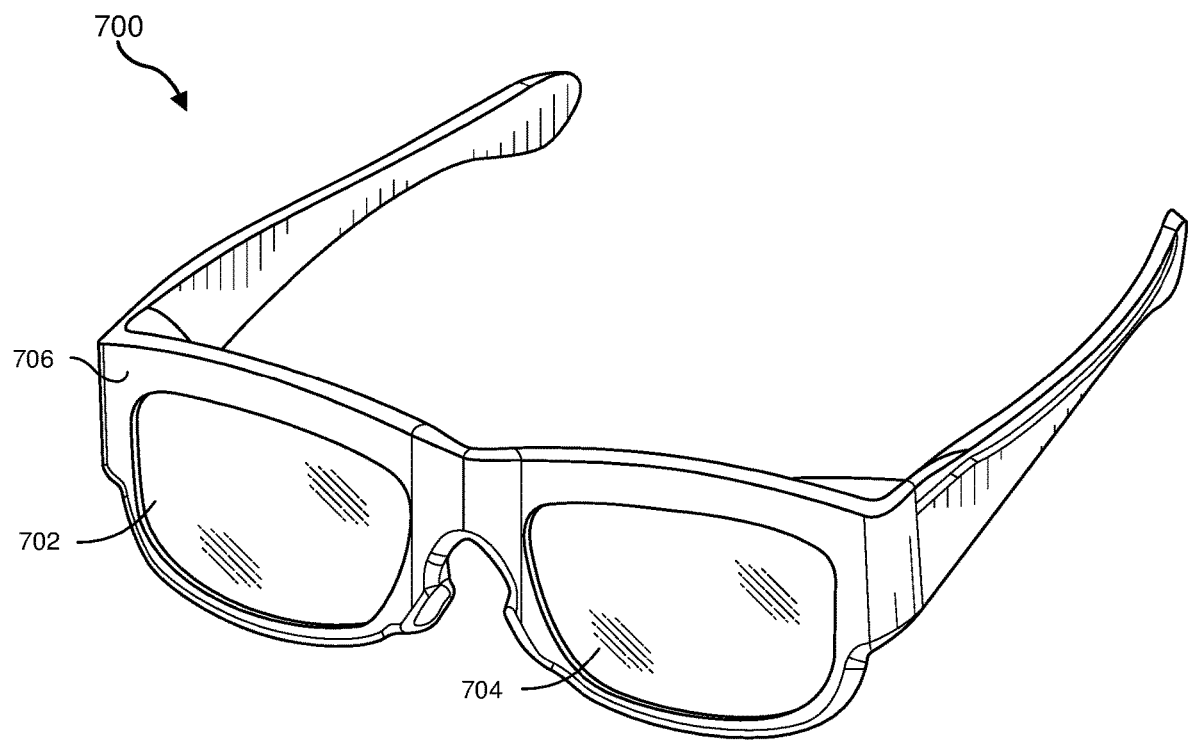
FIG. 7 shows an example head-mounted display device that may incorporate the light-blocking shutters disclosed herein, according to some embodiments.

The active and inactive display intervals 626 and 628 may each have any suitable duration, such as a duration of from approximately one nanosecond to one or more milliseconds. For example, pulse-code modulation (PCM) and/or pulse-width modulation (PWM) driven superluminescent light emitting diodes (SLEDS) for LCOS and/or fLCOS displays may have active display intervals 626 as short as approximately one nanosecond and inactive display intervals 628 of from approximately one nanosecond to several nanoseconds. The pulsed sub-period 622 may include a plurality of active display intervals 626 having the same pulse widths or different pulse widths. FIG. 7 shows an example head-mounted display device, in this example augmented reality glasses 700, which may include first and second light-blocking elements in respective lenses (or respective windows), such as lenses 702 and 704. In some examples, the light-blocking elements may have an outside peripheral shape conforming to the interior of a lens-holding portion of the frame 706. In some embodiments, the term lens may be used for plane windows used to allow light to ingress or egress from a device.

Figure 8A:
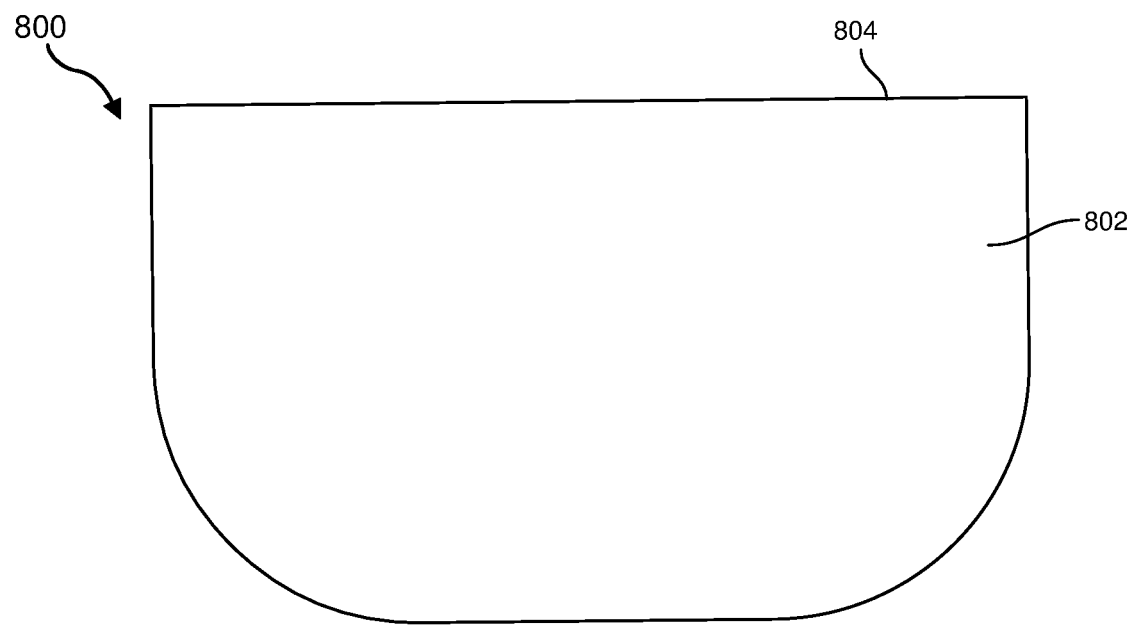
FIGS. 8A and 8B illustrate example light-blocking shutters according to some embodiments.
Figure 8B:
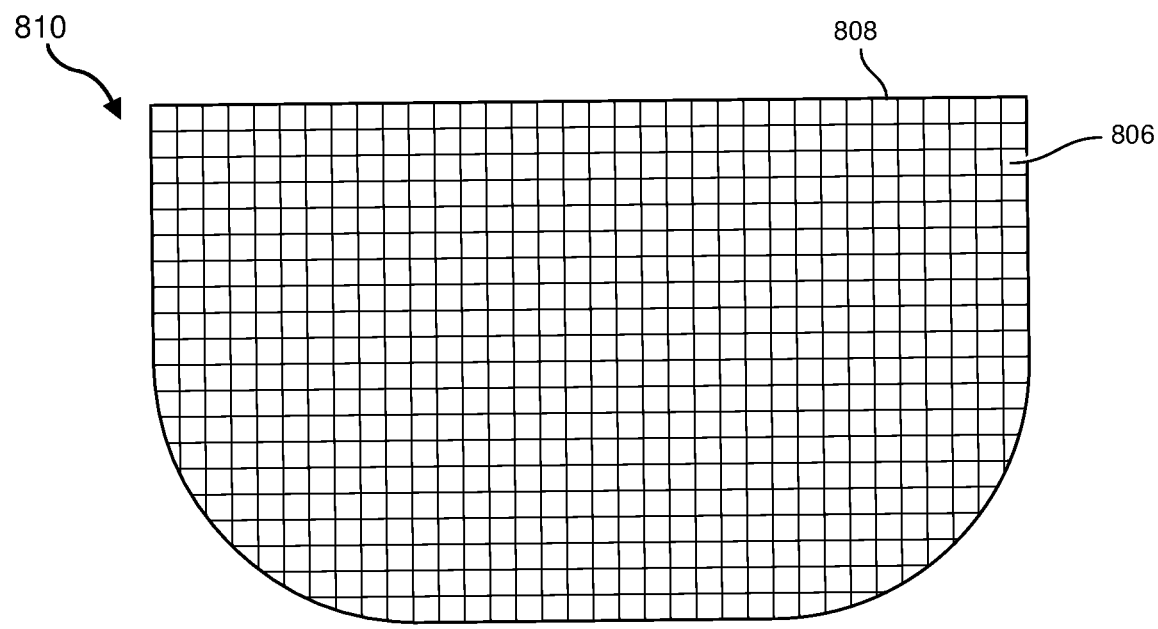

FIGS. 8A and 8B illustrate example light-blocking shutters. In some embodiments, as shown in FIG. 8A, a light-blocking shutter 800 may include a single pixel or light-blocking region 802 that covers the entire light-blocking area 804 of light-blocking shutter 800 (see, e.g., FIGS. 2B and 3B). In additional embodiments, as shown in FIG. 8B, a light-blocking shutter 810 may include multiple pixels or light-blocking regions 806 in light-blocking region 808. Accordingly, each of the light-blocking regions 806 may be simultaneously driven to block light over the entire light-blocking region 808 of light-blocking shutter 810 or, alternatively, light-blocking regions 806 may be selectively driven to block light in one or more portions of the light-blocking shutter 810, while other light-blocking regions 806 are not driven (see, e.g., FIGS. 4B and 5B). Additionally, some light-blocking regions 806 may be driven to block a substantial proportion of light while other light-blocking regions 806 may be selectively driven to block lower proportions of light (e.g., to further decrease the visibility of the light-blocking shutter 810 in various situations).

Each of light-blocking regions 802 and 806 of light-blocking shutters 800 and 810 may be an optical shutter element (e.g., a liquid-crystal shutter element or mechanical shutter element) capable of blocking or controlling light transmittance. An optical shutter element may have pixels that have dark or light states. In a dark state, the pixel may be generally opaque and block light from a portion of the local environment from reaching the user's view. In a light state, the pixel may be relatively transparent, allowing light from the local environment to pass through the pixel and reach the user's view. In some examples, a blocking element may include pixels with multiple available state options (for example, clear/dim/opaque or clear/variable dimness). For example, an optical shutter element, such as a liquid crystal shutter element, may have pixels that have at least one gray state in addition to the dark and light states.

In some embodiments, light-blocking shutters 800 and 810 may include guest-host liquid crystal shutters that include, for example, a liquid crystal layer (such as a nematic liquid crystal) incorporating a dye (e.g., including dye molecules oriented within a nematic liquid crystal). In some embodiments, a nematic liquid crystal molecule may include a dye moiety. In some embodiments, a liquid crystal layer may include a polymer dispersed liquid crystal (PDLC, where the liquid crystal may be a nematic liquid crystal) or a polymer-stabilized liquid crystal, such as a polymer stabilized cholesteric texture. In various embodiments, light-blocking shutters 800 and 810 may include polarizer-based liquid crystal shutters that are capable of switching at the disclosed operating frequencies (e.g., in a range of about 60 Hz to 2000 Hz). In some embodiments, light-blocking shutters 800 and 810 may include electrostatically activated micro-blinds based devices.

Figure 9A:
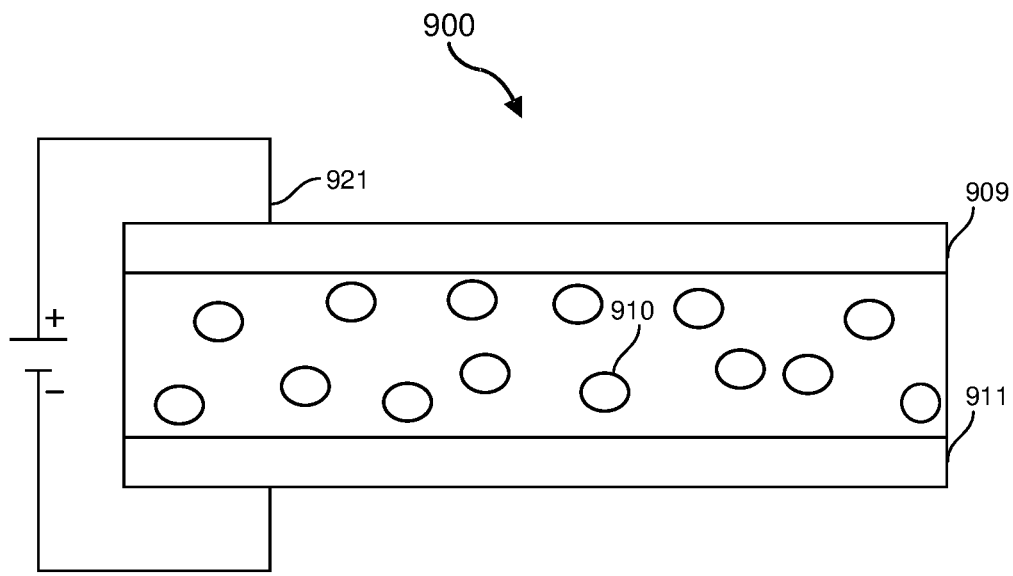
FIGS. 9A and 9B illustrate an exemplary switchable electroactive region of a light-blocking device according to some embodiments.
Figure 9B:
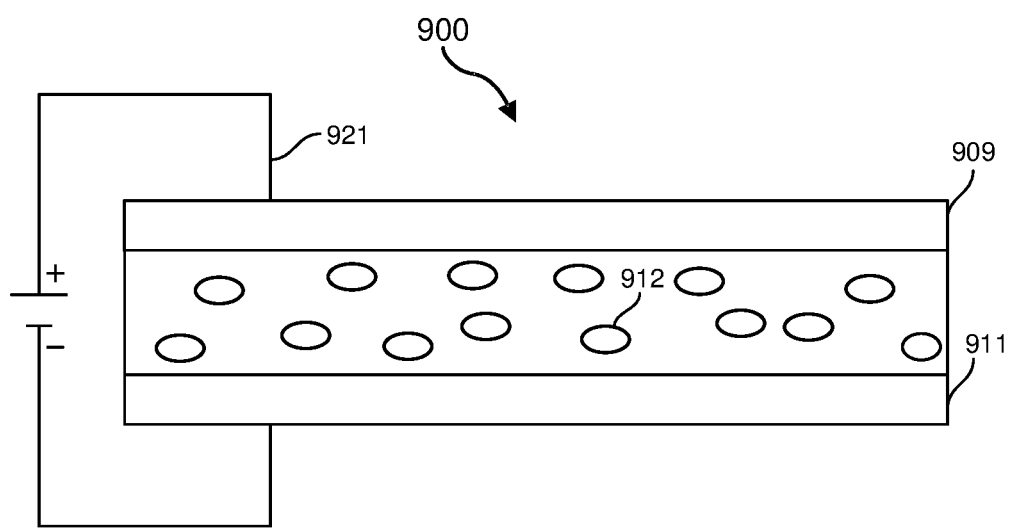

FIGS. 9A and 9B illustrate an exemplary switchable electroactive region 900 of a light-blocking device (e.g., a screen) in an uncompressed state and in a compressed state, respectively. In particular, electroactive region 900 may be configured to be opaque in an uncompressed state and transparent in a compressed state. As shown in FIG. 9A, electroactive region 900 (e.g., an electroactive polymer (EAP)) may include nanovoids 910. For example, as will be described in greater detail below, electroactive region 900 may include a polymer material (e.g., an elastomeric polymer) defining a plurality of nanovoids 910. Further, the electroactive region may include electrodes 909 and 911 electrically coupled to electroactive region 900 and configured to apply an electric field to electroactive region 900. Electrodes 909 and 911 may include any suitable electrically conductive material, such as, for example, an optically transparent material (e.g., a transparent conducting film including a transparent conductive oxide such as indium tin oxide, fluorine doped tin oxide, and/or doped zinc oxide, a conductive polymer such as a polyacetylene, polyaniline, polypyrrole, and/or polythiophene derivative, carbon nanotubes, and/or graphene). Moreover, a voltage may be applied to electroactive region 900 using a circuit 921 that generates an electric field across electroactive region 900. In some examples, electroactive region 900 may be compressible by an application of the electric field which decreases the nanovoids' average size and increases a density of nanovoids in electroactive region 900.

FIG. 9A shows electroactive region 900 in an uncompressed state in which circuit 921 of the electroactive region applies no voltage or a relatively low voltage across electroactive region 900 via electrodes 909 and 911. Accordingly, nanovoids 910 may be larger in size with respect to a compressed state and may therefore scatter incident light. As noted, the uncompressed state of electroactive region 900 (FIG. 9A) may correspond to the nanovoids having a size on the order of a wavelength of the light, and the compressed state of electroactive region 900 (FIG. 9B) may correspond to the nanovoids having a size that is substantially smaller than the wavelength of the light. For example, electroactive region 900 may scatter light having wavelengths in the visible spectrum (i.e., about 380 to about 2740 nm), or at least a portion thereof. Moreover, the degree of scattering of incident light by electroactive region 900 may be based, at least in part, on the density or the average size of the nanovoids. In some examples, the size of the nanovoids may range from about 0.1 nm to about 26000 nm. Further, the size range for the nanovoids (e.g., the polydispersity of the nanovoids) may vary by a factor of about five or more (i.e., the nanovoids may exhibit a diameter change of 5X or more) between the compressed and uncompressed states (e.g., the size range for the nanovoids between the compressed and uncompressed states may vary by a factor of between approximately 2 to approximately 20 or more). In some examples, the shape of the nanovoids in electroactive region 900 may include any suitable shape including, but not limited to, spheroid shapes, ellipsoid shapes, disk-like shapes, and/or irregular shapes, and the nanovoid shapes may change between the compressed and uncompressed states.

In some examples, electroactive region 900 may include a single pair of electrodes, such as electrodes 909 and 911, or multiple pairs of electrodes (not shown) that may be patterned across a region of an electroactive element (e.g., similar to electroactive region 900). In particular, electroactive region 900 may correspond to an aperture associated with the electroactive region used in a head-mounted display ("HMD"). This may be done in order to create spatially controllable light scattering (e.g., scattering that is implemented with differing magnitudes at different regions of electroactive region 900). Further, while electrodes may serve to impart an electric field onto electroactive region 900 and modify the electroactive region properties as described herein, in other examples electroactive region 900 may be switched with at least a partially non-electrical technique. In particular, electroactive region 900 may be switched based on a mechanical compression of electroactive region 900 or may be switched using acoustic waves that may propagate through electroactive region 900.

FIG. 9B shows electroactive region 900 in a compressed state. In particular, circuit 921 may apply an increased voltage across electroactive region 900 via electrodes 909 and 911. Accordingly, the disclosed systems may apply an electric field (not shown) between the electrodes 909 and 911 of the electroactive region. This may lead to the compression of nanovoids 912 as compared with their uncompressed state (shown and described in connection with FIG. 9A, above). The magnitude of the electric field may be configured to modify the extent of the compression of nanovoids 912. For example, the magnitude may be configured to reduce the size of nanovoids 912 to be relatively smaller than the wavelength of incident light on electroactive region 900 (e.g., smaller than wavelengths of light in the visible spectrum or at least a portion thereof), causing electroactive region 900 to become relatively transparent and thus allowing the incident light to propagate through electroactive region 900.

As nanovoids 912 are compressed, the size of nanovoids 912 may become several orders of magnitude smaller than wavelengths of light incident on electroactive region 900. In this case, the amount of light scattered from electroactive region 900 due to nanovoids 912 may be minimized during compression. Further, the interaction of electromagnetic fields with nanovoids 912 having a size that is substantially smaller than wavelengths of incident light may lead to Rayleigh scattering of the incident light from nanovoids 912. As the size of nanovoids 912 in electroactive region 900 increases, the amount of scattered light from electroactive region 900 may also increase. If nanovoids 912 are in the same or substantially the same size range as wavelengths of incident light, a Mie scattering mechanism may describe the scattering of the light from nanovoids 912.

In some examples, when there is little or no electric field applied to electroactive region 900 by electrodes 909 and 911, the size of nanovoids 912 may be less than about 26000 nm and greater than about 400 nm. As noted, the application of electric field across electroactive region 900 may result in a mechanical compression of electroactive region 900 from a prior uncompressed state. The magnitude of electric fields across the electrodes 909 and 911 can be selected to change the size and density of the nanovoids 912 to achieve a desired amount of transparency between the compressed and uncompressed states. In a compressed state, nanovoids 912 of electroactive region 900 may be reduced, in the compressed state, to sizes of from about 0.1 nm to about 50 nm based on the magnitude of the applied electrical field.

Figure 10A:
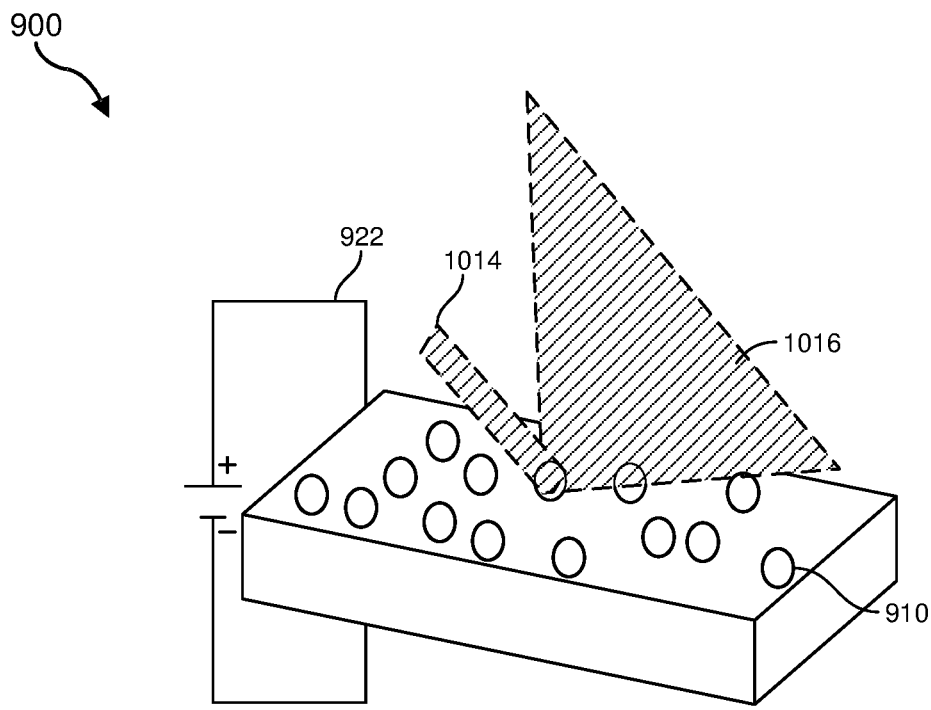
FIGS. 10A and 10B illustrate additional examples of an exemplary switching electroactive region of a light-blocking device according to some embodiments.
Figure 10B:
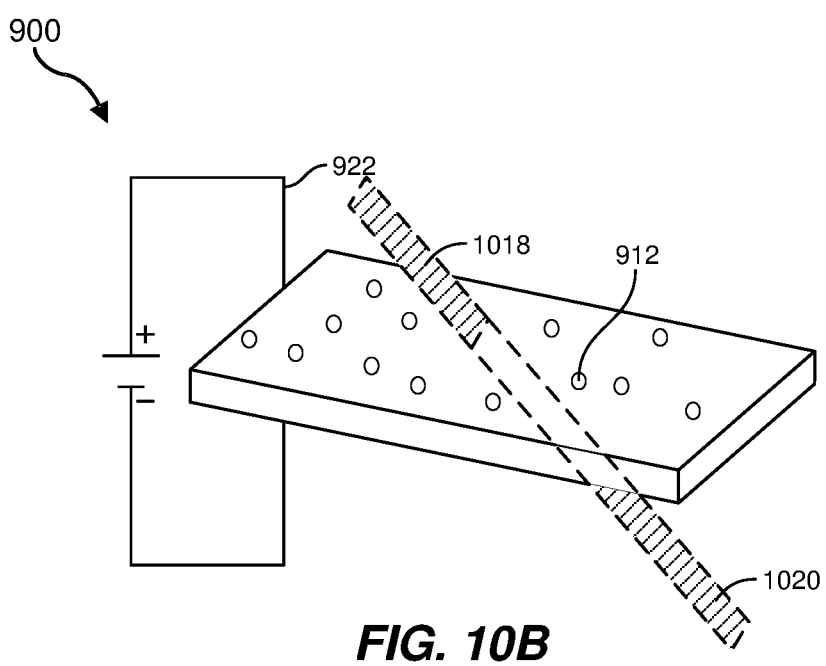

FIGS. 10A and 10B illustrate exemplary switchable electroactive region 900 of a light-blocking device in an uncompressed state and a compressed state, respectively. In particular, FIG. 10A shows incident light 1014 scattering off electroactive region 900 in the uncompressed state to produce scattered light 1016 via a Rayleigh scattering mechanism. As noted, this scattering may be due to the fact that nanovoids 910 may have a size that is on the order of the wavelength of incident light when a voltage applied by circuit 922 (e.g., via opposed electrodes, such as electrodes 909 and 911 in FIGS. 26A and 26B) is below a predetermined threshold. Further, the fraction of incident light 1014 may be scattered because the size of nanovoids 910 is within about 0.1 to about 270 times the wavelength of incident light 1014. In one example, the fraction of scattered light 1016 can be anywhere from greater than about 95% to less than about 5% of incident light 1014 on electroactive region 900.

FIG. 10B shows a compressed state of electroactive region 900 shown in FIG. 9A. In particular, incident light 1018 may be transmitted through electroactive region 900 to produce transmitted light 1020 when nanovoids 912 are compressed to be much smaller than the wavelength of incident light 1018. As noted, nanovoids 912 may be compressed when an electric field is applied to electroactive region 900 as a result of a voltage applied by circuit 922.

In particular, if a beam of visible wavelength light (e.g., incident light 1018) is directed towards electroactive region 900 when electroactive region 900 is in a compressed state, electroactive region 900 may scatter relatively little light because the size of nanovoids 912 may be much smaller than the wavelength of light. Accordingly, electroactive region 900 may be transparent in the visible portion of the electromagnetic spectrum. In another embodiment, by modulating the electrical field applied across electroactive region 900 as a function of time, electroactive region 900 can serve as a switchable component, such as, for example, a switchable screen, a time-varying beam-block, and/or a time-varying intensity modulator for light in the visible and near-infrared portion of the electromagnetic spectrum.

Figure 11A:
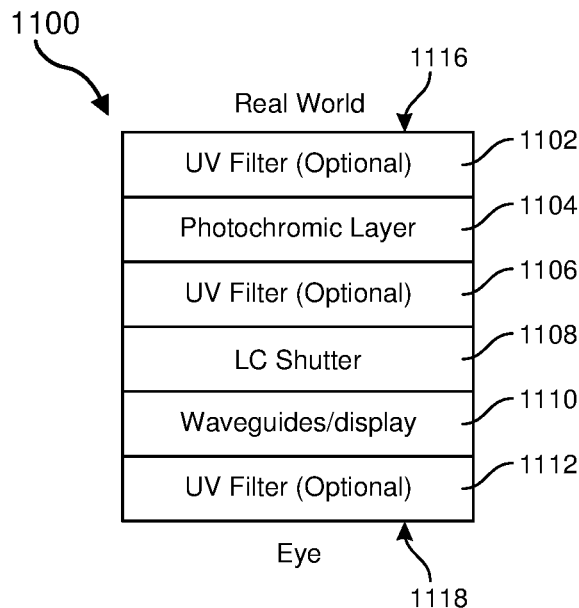
FIGS. 11A and 11B show multilayer structures in accordance with some embodiments.
Figure 11B:
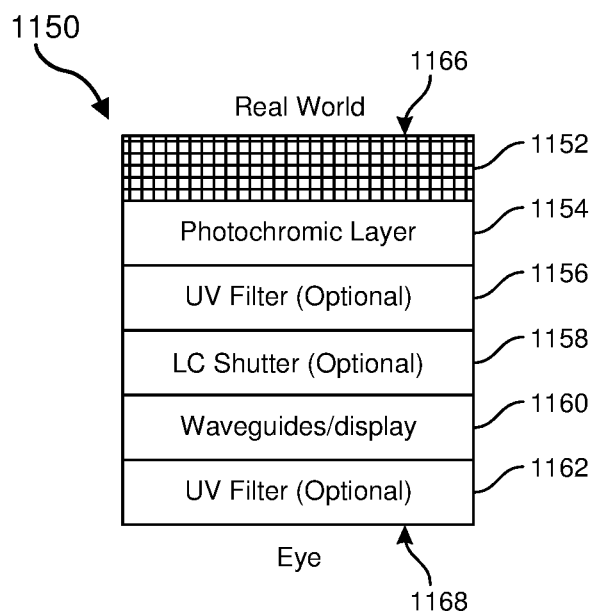

FIGS. 11A-11B show multilayer structures in accordance with some embodiments. FIG. 11A shows a multilayer structure that may be used, for example, as a component of an augmented-reality system to provide light-blocking via a liquid crystal shutter layer along with additional selective dimming provided by one or more photochromic layers activate by, for example, UV light and/or heat. The multilayer structure 1100 may include an optional UV filter layer 1102, a photochromic layer 1104, another optional UV filter layer 1106, an LC shutter 1108, an augmented reality display/waveguide 1110, and another optional UV filter layer 1112. The multilayer structure 1100 may include an exterior surface 1116 configured to face towards the local environment and an exterior surface 1118 configured to be proximate the eye of a user when the multilayer structure is used in an augmented reality system. Optional UV light sources may be disposed around the photochromic layer 1104.

FIG. 11B shows another multilayer structure that may be used, for example, as a component of an augmented reality system. The multilayer structure 1150 includes a UV-absorbing pixelated shutter 1152, a photochromic layer 1154, an optional UV filter layer 1156, an optional LC shutter 1158, an augmented reality display/waveguide 1160, and another optional UV filter layer 1162. The multilayer structure 1150 may include an exterior surface 1166 configured to face towards the local environment and an exterior surface 1168 configured to be proximate the eye of a user when the multilayer structure 1150 is used in an augmented reality system. Optional UV light sources may be disposed around the photochromic layer 1154.

Figure 12A:
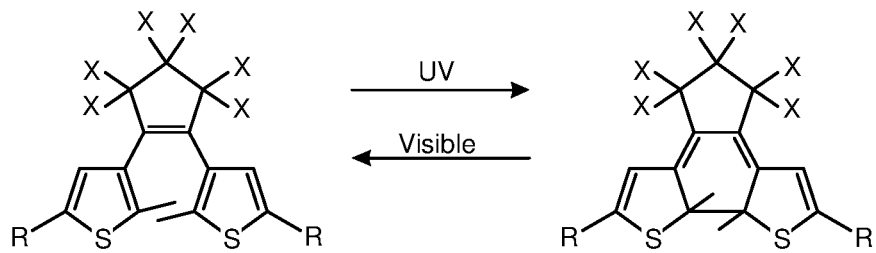
FIGS. 12A-12C show representative photochromic materials that may be used in light-blocking elements in accordance with some embodiments.
Figure 12B:
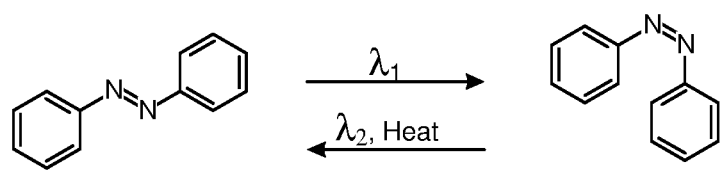
Figure 12C:
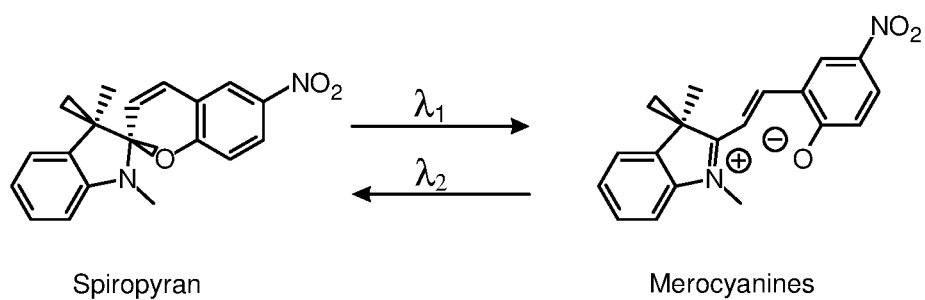

FIGS. 12A-12C show representative photochromic materials that may be used in blocking elements in accordance with some embodiments. FIG. 12A shows diarylethene photochromic materials that may be switched to a second state using UV and may revert back to the first state under visible illumination. FIG. 12B shows azobenzene photochromic materials that may be switched to a second state using UV and revert back to the first state under a combination of light and/or heat. FIG. 12C shows spiropyran materials (e.g., thiospiropyrans or nitrospiropyrans). Other example photochromic materials may include oxazine (e.g., which switches to a dark second state using light and reverts back to a clear first state under heat), napthopyrans (e.g., which switches to a dark second state using light and reverts back to a clear first state under heat), derivatives and other combinations of materials mentioned herein, and the like. In some examples, blue or violet light may be used to induce the second photochromic state (e.g., the dark state) instead of, or additional to, the use of UV. In some examples, a photochromic material may be present as a layer. In some examples, a liquid crystal layer may include a photochromic material. If the photochromic material is anisotropic, it may be aligned by the liquid crystal. In some examples, a liquid crystal material may include molecules (such as nematogens) having a photochromic moiety.

Figure 13A:
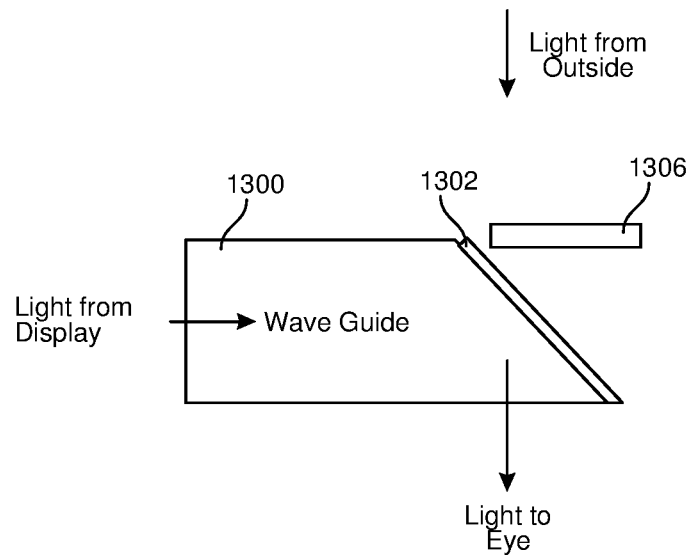
FIGS. 13A and 13B show a portion of an artificial-reality system that includes a light-blocking device according to some embodiments.

FIG. 13A shows a portion of an artificial-reality system including a waveguide 1300 configured to receive light from an artificial-reality display (such as an artificial-reality projection display) and a half-mirror 1302 receiving light from the artificial-reality display through waveguide 1300 and light from outside through a light-blocking device 1306. A portion of light-blocking device denoted 1306 may be relatively clear (transmissive) to pass through a portion of light from outside, which may be termed ambient light. The combination of the ambient light, and artificial-reality image elements provided through the waveguide, may be passed to the eye of a user to provide an artificial-reality image. The artificial-reality image may be a combination of the ambient image and any artificial-reality image element(s). There may be additional optical components, such as focusing lenses, that are not shown for clarity.

Figure 13B:
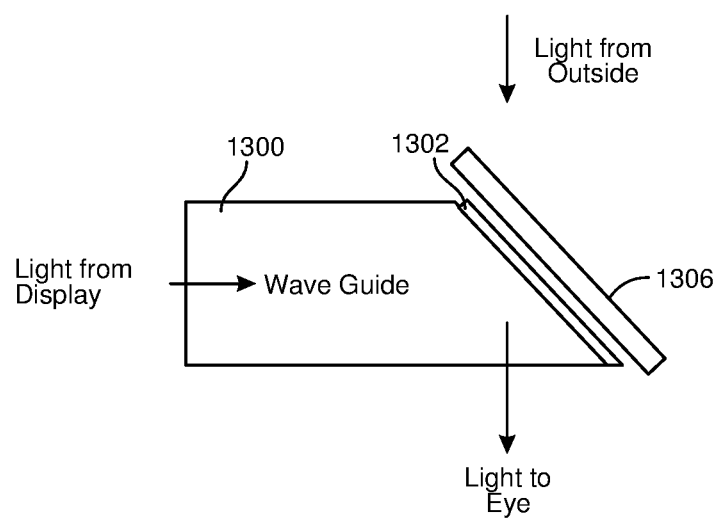

FIG. 13B shows a portion of an artificial-reality system with similar components to FIG. 13A. In this configuration, light-blocking device 1306 may have an oblique arrangement proximate half-mirror 1302. In some examples, a control system may be used to determine the correct portion of light-blocking device 1306 to activate or reactivate (e.g., switch into a light or dark state) to provide localized light blocking or light transmittance.

Figure 14:
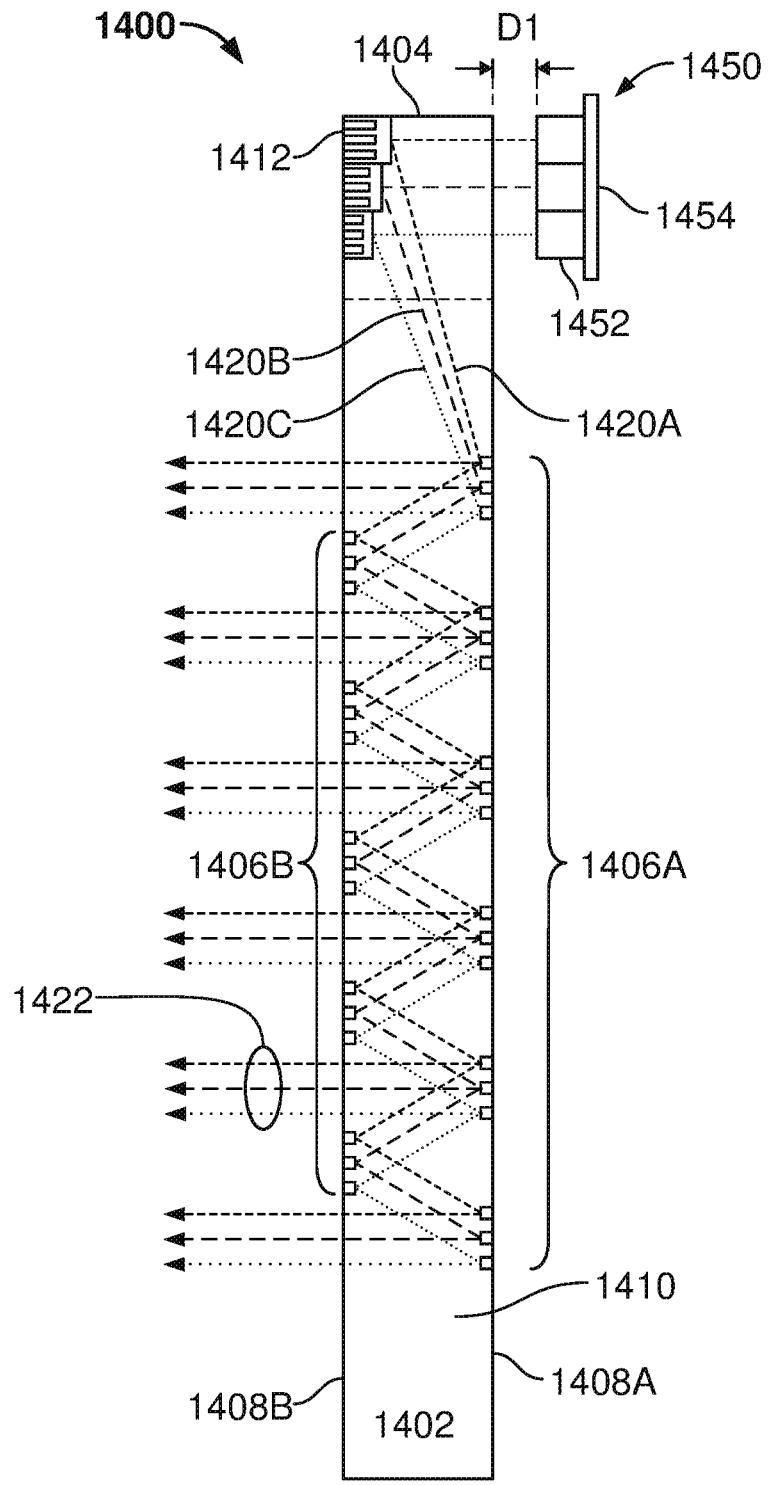
FIG. 14 illustrates a cross-sectional view of a display system that includes a projector device and a waveguide configuration according to some embodiments.

FIG. 14 is a cross-sectional view of a display system that includes a projector device and a waveguide configuration, according to some embodiments. The illustrated depicted in FIG. 14 may provide for projection of many image replications (e.g., pupil replications), while other embodiments may instead provide for decoupling a single image projection at a single point. Outputting a single image toward a view region may preserve the intensity of the coupled image light. Some embodiments that provide for decoupling at a single point may further provide for steering of the output image light. Such pupil-steering NEDs may further include systems for eye tracking to monitor a user's gaze. Some embodiments of the waveguide configurations that provide for pupil replication, as described herein, may provide for one-dimensional replication, while other embodiments may provide for two-dimensional replication. As illustrated in FIG. 14, two-dimensional pupil replication may include directing light into and outside the plane of each figure. Although the figures are presented in a simplified format, the detected gaze of the user may be used to adjust the position and/or orientation of the emitter arrays individually or the projector device 1450 as a whole and/or to adjust the position and/or orientation of the waveguide configuration.

In FIG. 14, a waveguide configuration 1400 may be disposed in cooperation with a projector device 1450, which may include one or more monochromatic emitters 1452 secured to a support structure 1454 (e.g., a printed circuit board or another structure). The waveguide configuration 1400 may be separated from the projector device 1450 by an air gap having a distance D1. The distance D1 may be in a range from approximately 50 μm to approximately 500 μm, in some examples. The monochromatic image or images projected from the projector device 1450 may pass through the air gap toward the waveguide configuration 1400. Any of the projector device embodiments described herein may be utilized as the projector device 1450.

The waveguide configuration 1400 may include a waveguide 1402, which may be formed from a glass or plastic material. The waveguide 1402 may include a coupling area 1404 and a decoupling area formed by decoupling elements 1406A on a top surface 1408A and decoupling elements 1406B on a bottom surface 1408B, in some embodiments. The area within the waveguide 1402 (in-between the decoupling elements 1406A and 1406B) may be considered a propagation area 1410, in which light images received from the projector device 1450 and coupled into the waveguide 1402 by coupling elements included in the coupling area 1404 may propagate laterally within the waveguide 1402.

The coupling area 1404 may include a coupling element 1412 configured and dimensioned to couple light of a predetermined wavelength, e.g., red, green, or blue light. When a white light emitter array is included in the projector device 1450, the portion of the white light that falls in the predetermined wavelength may be coupled by each of the coupling elements 1412. In some embodiments, the coupling elements 1412 may be gratings, such as Bragg gratings, dimensioned to couple a predetermined wavelength of light. In some examples, the gratings of each coupling element 1412 may exhibit a separation distance between gratings associated with the predetermined wavelength of light that the particular coupling element 1412 is to couple into the waveguide 1402, resulting in different grating separation distances for each coupling element 1412. Accordingly, each coupling element 1412 may couple a limited portion of the white light from the white light emitter array, when included. In other examples, the grating separation distance may be the same for each coupling element 1412. In some examples, coupling element 1412 may be or include a multiplexed coupler.

As shown in FIG. 14, a red image 1420A, a blue image 1420B, and a green image 1420C may be coupled by the coupling elements of the coupling area 1404 into the propagation area 1410 and may begin traversing laterally within the waveguide 1402. A portion of the light may be projected out of the waveguide 1402 after the light contacts the decoupling element 1406A for one-dimensional pupil replication, and after the light contacts both the decoupling element 1406A and the decoupling element 1406B for two-dimensional pupil replication. In two-dimensional pupil replication embodiments, the light may be projected out of the waveguide 1402 at locations where the pattern of the decoupling element 1406A intersects the pattern of the decoupling element 1406B.

The portion of light that is not projected out of the waveguide 1402 by the decoupling element 1406A may be reflected off the decoupling element 1406B. The decoupling element 1406B may reflect all incident light back toward the decoupling element 1406A, as depicted. Accordingly, the waveguide 1402 may combine the red image 1420A, the blue image 1420B, and the green image 1420C into a polychromatic image instance, which may be referred to as a pupil replication 1422. The polychromatic pupil replication 1422 may be projected toward a viewing region that includes a user's eye (e.g., user's eye 202 in FIG. 2B), which may interpret the pupil replication 1422 as a full-color image (e.g., an image including colors in addition to red, green, and blue). The waveguide 1402 may produce tens or hundreds of pupil replications 1422 or may produce a single replication 1422.

Figure 15:
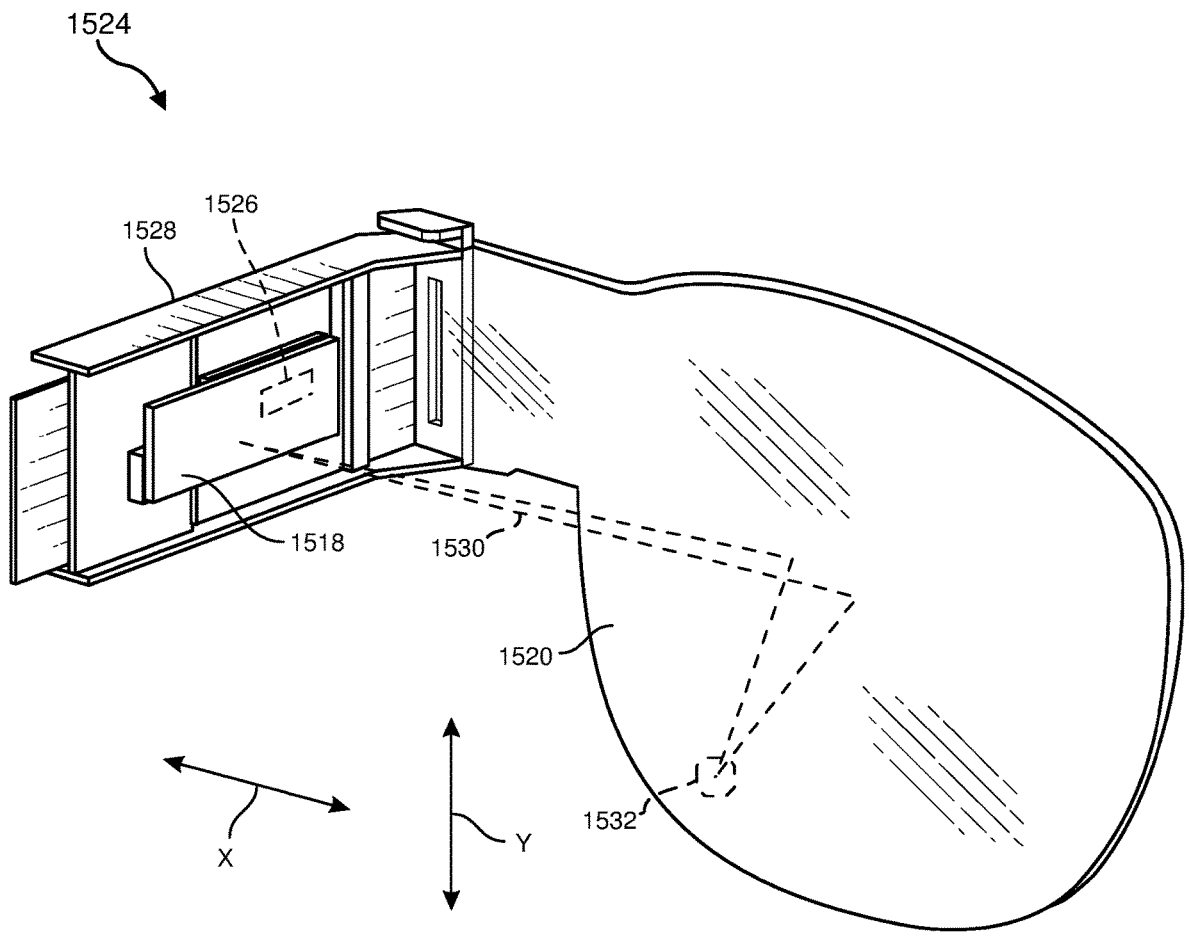
FIG. 15 illustrates a perspective view of an example asymmetric optical component including a projector assembly and an optical combiner according to some embodiments.

FIG. 15 provides a perspective view of an example asymmetric optical component including a projector assembly 1524 and an optical combiner 1520 (e.g., a holographic combiner). The projector 1518 may be attached to a support member 1528 that may, in turn, be movably coupled to the temple of, for example, an HMD frame (see, e.g., augmented-reality glasses 700 in FIG. 7). The projector 1518, support member 1528, and optical combiner 1520 may together form, or form a part of, the projector assembly 1524.

As shown in FIG. 15, the projector 1518 may be configured to project an image toward the optical combiner 1520 to reflect off the optical combiner 1520 toward an eye of the user. Projection of the image is shown by dashed projection lines 1530 in FIG. 15. After reflecting off the optical combiner 1520, the rays of light projected from the projector 1518 may converge at or through a pupil replication 1532, illustrated in FIG. 15 as a dashed circle. As an HMD system senses, using data from the eye-tracking system 1526, movement of the user's eye to the left, right, up, down, or a combination thereof, the HMD system may move the projector 1518 and/or the optical combiner 1520 (e.g., the projector assembly 1524) to position the pupil replication 1532 over or approximately over the pupil of the eye of the user. Thus, as the user looks in different directions through the optical combiner 1520, the projected image may remain in the user's view. The movement of the projector assembly 1524, or a portion thereof, may be sufficiently fast and precise to substantially correspond to movement of the user's eye.

In some embodiments, movement of the projector assembly 1524, or a portion thereof, may be substantially constrained to directions parallel to a major surface of the optical combiner 1520, such as along the X- and Y-directions depicted in FIG. 15. In some examples, the X-, Y-, and Z-directions are used for convenience and clarity in describing the embodiments depicted in the accompanying drawings and may refer to directions that are transverse (e.g., orthogonal) to each other. In some examples, the X-direction and Y-direction may be parallel to a major surface of the optical combiner and the Z-direction may be perpendicular to the surface. In one example, the X-direction may be substantially horizontal, and the Y-direction may be substantially vertical, relative to an upright user when the HMD system is in use. Of course, if the HMD system is used in other orientations, then the X- and Y-directions may not be respectively horizontal or vertical.

Figure 16:
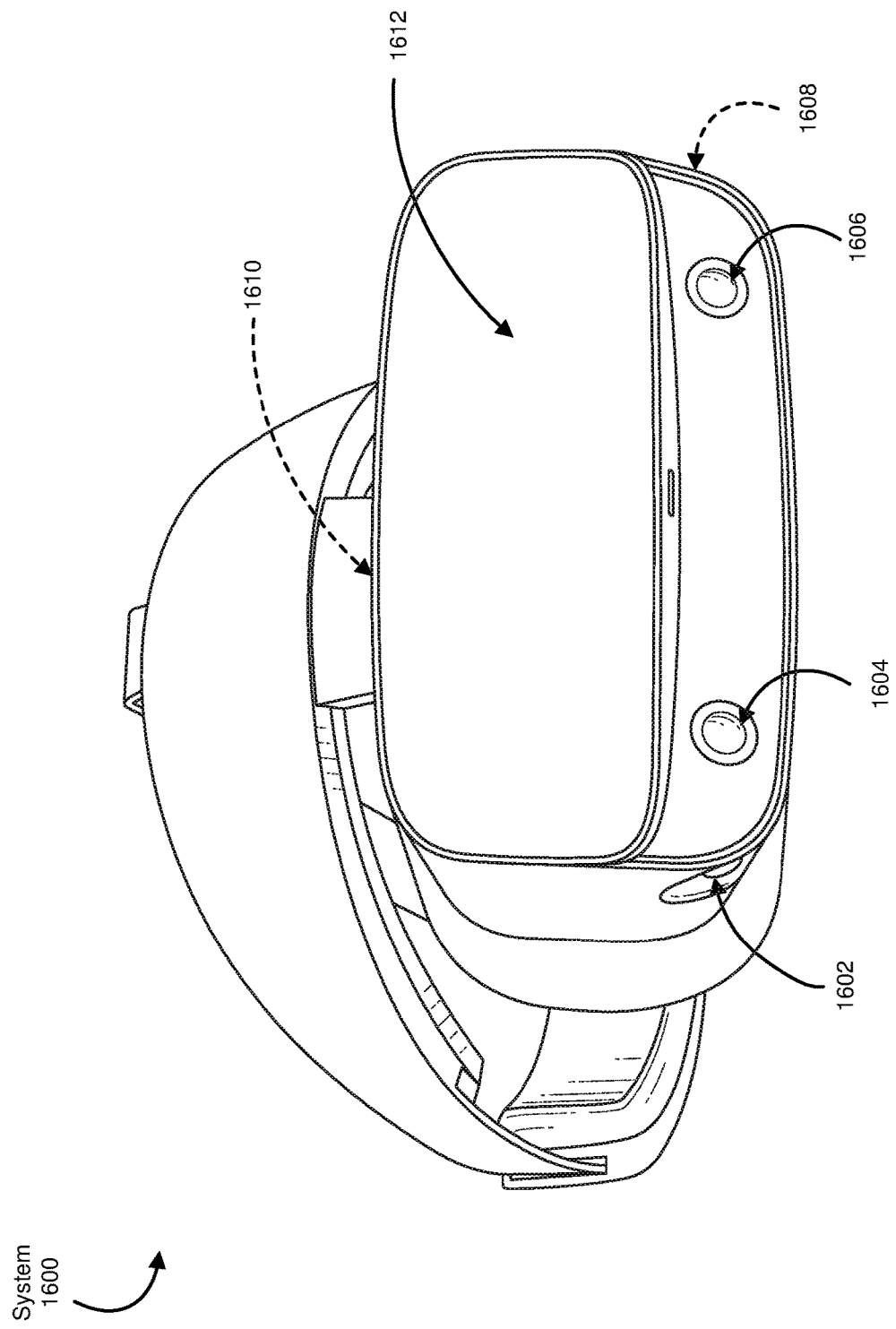
FIG. 16 illustrates an exemplary head-mounted display that includes multiple cameras, according to some embodiments.

FIG. 16 is an illustration of an exemplary head-mounted display that includes multiple cameras. In some embodiments, a head-mounted display 1600 may include cameras 1602, 1604, 1606, 1608, and/or 1610, and/or a display surface 1612. In some embodiments, camera 1602 may be mounted on the right surface of head-mounted display 1600, camera 1608 may be mounted on the left surface of head-mounted display 1600, camera 1604 may be mounted on the right side of the front, camera 1606 may be mounted on the left side of the front, and/or camera 1610 may be mounted centrally on the front of head-mounted display 1600. In some embodiments, cameras 1602, 1604, 1606, and/or 1608 may be mounted on rigid mounting points while camera 1610 may be mounted on a non-rigid mounting point. In one embodiment, cameras 1602, 1604, 1606, and/or 1608 may be mounted to a metal bracket set within head-mounted display 1600.

In some embodiments, cameras 1602, 1604, 1606, 1608, and/or 1610 may each be mounted flush with surfaces of head-mounted display 1600 (rather than protruding from head-mounted display 1600). In one embodiment, camera 1602 may be located behind camera 1604 (relative to the front of head-mounted display 1600) and/or may be angled at a downward angle, such as 45° downward. In some embodiments, camera 1602 may be located at a different downward angle, such as 30°, 60°, or any other appropriate angle. Similarly, camera 1608 may be located behind camera 1606 and/or may be angled at a downward angle. In some embodiments, cameras 1604, 1606, and 1610 may all be mounted on the same surface of the head-mounted display. In other embodiments, cameras 1604 and/or 1606 may be mounted on one front surface of the head-mounted display while camera 1610 may be mounted on a separate front surface of the head-mounted display. In some examples, cameras 1602, 1604, 1606, 1608, and/or 1610 may be used to capture a digital view (e.g., a 2D or 3D view) of a user's real-world environment. In some examples, display surface 1612 may be opaque to visible light, preventing the user from a direct view of the real-world environment. Alternatively, display surface 1612 may be at least partially transparent to visible light (i.e., light having a wavelength of about 380 nm to about 750 nm) and may allow light to pass through to an underlying display. In some embodiments, display surface 1612 may be a display or a light-blocking device.

Figure 17:
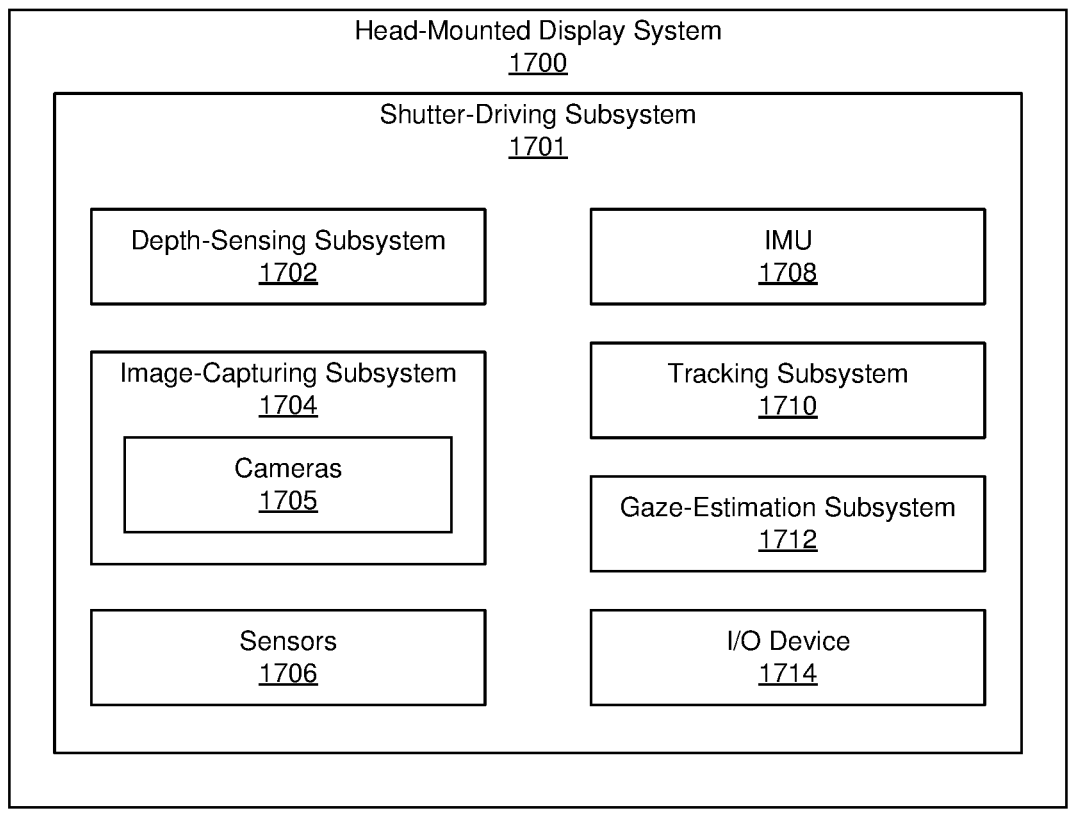
FIG. 17 illustrates an exemplary configuration of a shutter-driving subsystem of a head-mounted display system according to some embodiments.

FIG. 17 illustrates an exemplary configuration of a shutter-driving subsystem 1701 of a head-mounted display system 1700. Shutter-driving subsystem 1701 may detect events in a user's environment and/or may control how ambient light from in the user's real-world environment affects light-blocking configurations in head-mounted display system 1700 to the user. In some examples, shutter-driving subsystem 1701 may include a depth-sensing subsystem 1702 (or depth camera system), an image-capturing subsystem 1704, one or more additional sensors 1706 (e.g., position sensors, audio sensors, etc.), and/or an inertial measurement unit (IMU) 1708. One or more of these components may provide a tracking subsystem 1710 of shutter-driving subsystem 1701 information that can be used to identify and track objects in a real-world environment and/or determine the position of head-mounted display system 1700 relative to the real-world environment. Other embodiments of shutter-driving subsystem 1701 may also include a gaze-estimation subsystem 1712 configured to track a user's eyes relative to a display of head-mounted display system 1700 and/or objects in the real-world environment. Shutter-driving subsystem 1701 may also include an I/O device 1714 for receiving input from a user. Some embodiments of shutter-driving subsystem 1701 may have different components than those described in conjunction with FIG. 17.

In some examples, depth-sensing subsystem 1702 may capture data describing depth information characterizing a real-world environment surrounding some or all of head-mounted display system 1700. In some embodiments, depth-sensing subsystem 1702 may characterize a position or velocity of head-mounted display system 1700 and/or objects within the real-world environment. Depth-sensing subsystem 1702 may compute a depth map using collected data (e.g., based on a captured light according to one or more computer-vision schemes or algorithms, by processing a portion of a structured light pattern, by time-of-flight (ToF) imaging, simultaneous localization and mapping (SLAM), etc.). In some examples, the depth maps may be used to generate a model of the real-world environment surrounding head-mounted display system 1700. Accordingly, depth-sensing subsystem 1702 may be referred to as a localization and modeling subsystem or may be a part of such a subsystem.

In some examples, image-capturing subsystem 1704 may include one or more optical image sensors or cameras 1705 that capture and collect image data from a user's real-world environment. In some embodiments, cameras 1705 may provide stereoscopic views of a user's real-world environment that may be used by tracking subsystem 1710 to identify and track real-world objects. In some embodiments, the image data may be processed by tracking subsystem 1710 or another component of image-capturing subsystem 1704 to generate a three-dimensional model of the user's real-world environment and the objects contained therein. In some examples, image-capturing subsystem 1704 may include simultaneous localization and mapping (SLAM) cameras or other cameras that include a wide-angle lens system that captures a wider field-of-view than may be captured by the eyes of the user.

In some examples, IMU 1708 may generate data indicating a position and/or orientation of head-mounted display system 1700 based on measurement signals received from one or more of sensors 1706 and from depth information received from depth-sensing subsystem 1702 and/or image-capturing subsystem 1704. For example, sensors 1706 may generate one or more measurement signals in response to motion of head-mounted display system 1700. Examples of sensors 1706 include one or more accelerometers, one or more gyroscopes, one or more magnetometers, another suitable type of sensor that detects motion, a type of sensor used for error correction of IMU 1708, or some combination thereof. Based on the one or more measurement signals from one or more of position sensors 1706, IMU 1708 may generate data indicating an estimated current position, elevation, and/or orientation of head-mounted display system 1700 relative to an initial position and/or orientation of head-mounted display system 1700. For example, sensors 1706 may include multiple accelerometers to measure translational motion (forward/back, up/down, left/right) and multiple gyroscopes to measure rotational motion (e.g., pitch, yaw, roll). As described herein, image-capturing subsystem 1704 and/or depth-sensing subsystem 1702 may generate data indicating an estimated current position and/or orientation of head-mounted display system 1700 relative to the real-world environment in which head-mounted display is used.

Tracking subsystem 1710 may include one or more processing devices or physical processors that (1) identifies and tracks objects in a user's real-world environment and (2) detects pass-through triggering events involving the objects in accordance with information received from one or more of depth-sensing subsystem 1702, image-capturing subsystem 1704, sensors 1706, IMU 1708, and gaze-estimation subsystem 1712. In some embodiments, tracking subsystem 1710 may monitor real-world objects that can be observed by depth-sensing subsystem 1702, image-capturing subsystem 1704, and/or by another system. Tracking subsystem 1710 may also receive information from one or more eye-tracking cameras included in some embodiments of shutter-driving subsystem 1701 to track a user's gaze. In some examples, a user's gaze angle may inform shutter-driving subsystem 1701 of which region of a light-blocking device (e.g., light-blocking shutter 402 in FIG. 4) should block light and which other regions should pass through light or partially block light.

Figure 18:
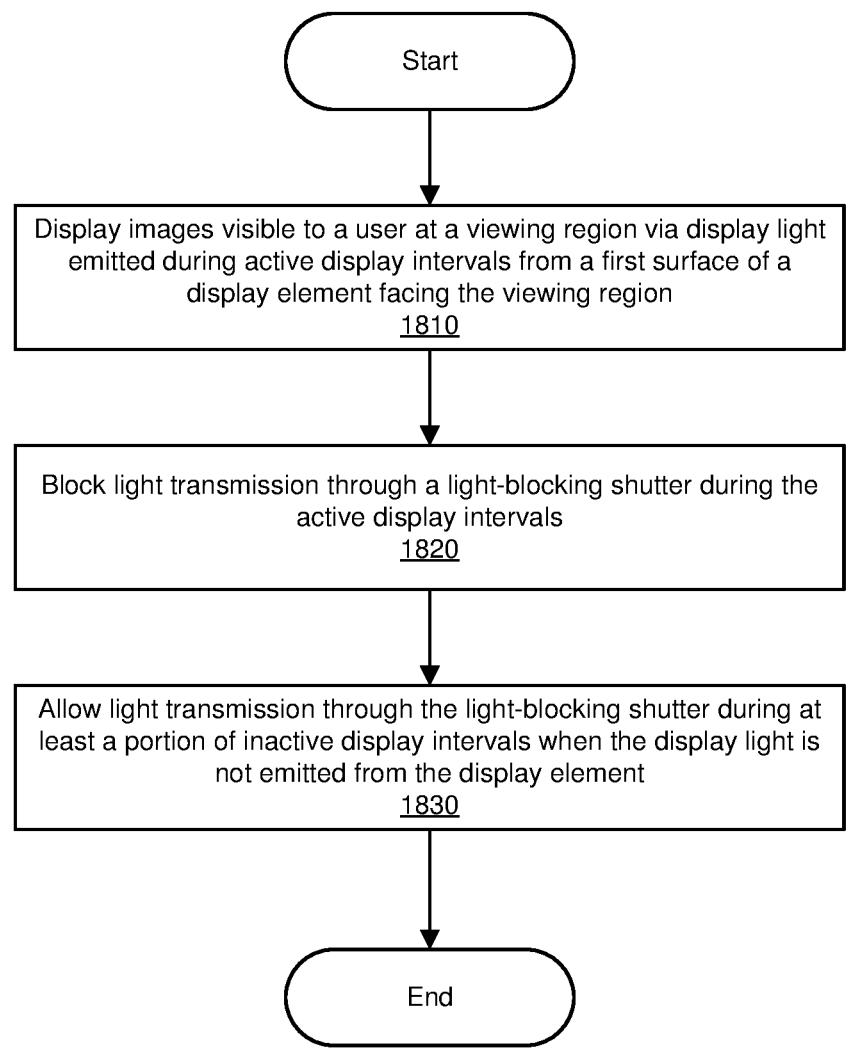
FIG. 18 is a flow diagram of an exemplary computer-implemented method for minimizing external light leakage from an artificial-reality display according to some embodiments.

FIG. 18 is a flow diagram of an exemplary computer-implemented method 1800 for minimizing external light leakage from artificial-reality displays. The steps shown in FIG. 18 may be performed by any suitable computer-executable code and/or computing system, including the system illustrated in FIGS. 1 and 17. In one example, each of the steps shown in FIG. 18 may represent an algorithm whose structure includes and/or is represented by multiple sub-steps, examples of which will be provided in greater detail below.

As illustrated in FIG. 18, at step 1810 one or more of the systems described herein may display images visible to a user at a viewing region via display light emitted during active display intervals from a first surface of a display element facing the viewing region. For example, display-driving subsystem 104 may display images 106 to a user of display system 100 via display light 210 from first surface 206 of display element 102 (see, e.g., FIGS. 1, 2B, and 3B). The display element 102 may be transparent and may further include a second surface opposite the first surface, the second surface facing an external environment (see, e.g., real-world environment 200 in FIGS. 2A and 2B).

At step 1820, one or more of the systems described herein may block light transmission through a light-blocking shutter during the active display intervals. For example, shutter-driving subsystem 112 may block light transmission through light-blocking shutter 110 during the active display intervals, as shown, for example, in FIGS. 2B, 3B, 4B, and 5B-6B. The light-blocking shutter may face and overlap at least a portion of the second surface of the display element.

In some embodiments, blocking light transmission through the light-blocking shutter during the active display intervals may include blocking light transmission through the light-blocking shutter during the entirety of each of the active display intervals. In various examples, the method may further include blocking light transmission through the light-blocking shutter during a portion of at least one of an inactive display interval immediately prior to or immediately following each of the active display intervals (see, e.g., FIGS. 6A and 6B).

At step 1830, one or more of the systems described herein may allow light transmission through the light-blocking shutter during at least a portion of inactive display intervals when the display light is not emitted from the display element. For example, shutter-driving subsystem 112 may allow light transmission through the light-blocking shutter 110 during at least a portion of inactive display intervals when the display light is not emitted from the display element, as shown, for example, in FIGS. 2A, 3A, 4A, 5A, 6A, and 6B.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure. By way of example and not limitation, some embodiments of the present disclosure include the following:

Example 1: A display system, comprising: (1) a display element that is transparent and comprises a first surface facing a viewing region and a second surface opposite the first surface, the second surface facing an external environment; (2) a light-blocking shutter that faces and overlaps at least a portion of the second surface of the display element; (3) a display-driving subsystem that displays images visible to a user at the viewing region via display light emitted from the first surface of the display element during active display intervals; and (4) a shutter-driving subsystem that alternately switches the state of the light-blocking shutter between a blocking state in which light transmission through the light-blocking shutter is blocked during the active display intervals and a pass-through state in which light transmission through the light-blocking shutter is enabled during at least a portion of inactive display intervals when the display light is not emitted from the display element.

Example 2: The display system of example 1, wherein the shutter-driving subsystem maintains the light-blocking shutter in the blocking state during the entirety of each of the active display intervals.

Example 3: The display system of any of examples 1 and 2, wherein the shutter-driving subsystem maintains the light-blocking shutter in the blocking state during a portion of at least one of an inactive display interval immediately prior to or immediately following each of the active display intervals.

Example 4: The display system of any of examples 1-3, wherein the display-driving subsystem displays the images during consecutive cycle periods each comprising one or more active display intervals and one or more inactive display intervals.

Example 5: The display system of any of examples 1-4, wherein each of the one or more active display intervals of each cycle period has a duration of from approximately 0.1% to approximately 50% of the total duration of the cycle period.

Example 6: The display system of any of example 1-5, wherein, for each cycle period: (1) the one or more active display intervals comprise a plurality of active display intervals pulsed during a burst sub-period; and (2) the one or more inactive display intervals comprise a plurality of inactive display intervals alternating with the active display intervals during the pulsed cycle sub-period and an extended inactive display interval occurring during an OFF sub-period.

Example 7: The display system of any of examples 1-6, wherein the pulsed sub-period has a duration of from approximately 0.00001% to approximately 30% of the total duration of the cycle period.

Example 8: The display system of any of examples 1-7, wherein the shutter-driving subsystem maintains the light-blocking shutter in the blocking state during the entirety of the pulsed sub-period.

Example 9: The display system of any of examples 1-8, wherein the light-blocking shutter comprises one light-blocking region or multiple light-blocking regions that are individually operable in response to signals from the shutter-driving subsystem.

Example 10: The display system of any of examples 1-9, wherein the light-blocking shutter comprises at least one of a liquid crystal shutter or a mechanical shutter, the light blocking being accomplished by absorption, reflection or scattering of the light.

Example 11: The display system of any of examples 1-10, wherein the light-blocking shutter further comprises an additional shutter layer comprising an electrochromic material that is selectively transmissive.

Example 12: The display system of any of examples 1-11, wherein the display element comprises at least one of a waveguide or an optical combiner.

Example 13: The display system of any of examples 1-12, wherein: (1) the display element further comprises a pass-through region through which light from the external environment is transmitted at least when the light-blocking shutter is in the pass-through state; and (2) the shutter-driving subsystem drives the light-blocking shutter to block light transmission through a light-blocking region of the light-blocking shutter overlapping at least a portion of the pass-through region of the display element.

Example 14: The display system of any of examples 1-13, wherein the light-blocking region substantially or entirely overlaps the pass-through region of the display element.

Example 15: The display system of any of examples 1-14, wherein (1) the light-blocking region overlaps a selected portion of the pass-through region of the display element so as to block externally-directed light from at least one of a light-emitting region of the display element or a portion of the user's face illuminated by the display light; and (2) the light-blocking region does not overlap a surrounding portion of the pass-through region of the display element outside of the selected portion.

Example 16: The display system of any of examples 1-15, wherein the shutter-driving subsystem drives the light-blocking shutter to block light transmission through a surrounding region of the light-blocking shutter outside of the light-blocking region to a lesser extent than light-blocking region.

Example 17: A head-mounted display device, comprising: (1) an optical subsystem that provides a user with composite views of displayed images and an external environment, the optical subsystem comprising: (a) a transparent display element that comprises a first surface facing a viewing region and an opposite second surface facing the external environment, and (b) a light-blocking shutter that faces and overlaps at least a portion of the second surface of the display element; (2) a display-driving subsystem that displays images visible to the user at the viewing region via display light emitted from the first surface of the display element during active display intervals; and (3) a shutter-driving subsystem that alternately switches the state of the light-blocking shutter between a blocking state in which light transmission through the light-blocking shutter is blocked during the active display intervals and a pass-through state in which light transmission through the light-blocking shutter is enabled during at least a portion of inactive display intervals when the display light is not emitted.

Example 18: A computer-implemented method, comprising: (1) displaying images visible to a user at a viewing region via display light emitted during active display intervals from a first surface of a display element facing the viewing region, wherein the display element is transparent and further comprises a second surface opposite the first surface, the second surface facing an external environment; (2) blocking light transmission through a light-blocking shutter during the active display intervals, wherein the light-blocking shutter faces and overlaps at least a portion of the second surface of the display element; and (3) allowing light transmission through the light-blocking shutter during at least a portion of inactive display intervals when the display light is not emitted from the display element.

Example 19: The computer-implemented method of example 18, wherein blocking light transmission through the light-blocking shutter during the active display intervals comprises blocking light transmission through the light-blocking shutter during the entirety of each of the active display intervals.

Example 20: The computer-implemented method of any of examples 18 and 19, further comprising blocking light transmission through the light-blocking shutter during a portion of at least one of an inactive display interval immediately prior to or immediately following each of the active display intervals.

Embodiments of the present disclosure may include or be implemented in conjunction with various types of artificial-reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs), an example of which is augmented-reality system 1900 in FIG. 19. Other artificial-reality systems may include an NED that also provides visibility into the real world (e.g., augmented-reality system 2000 in FIG. 20) or that visually immerses a user in an artificial reality (e.g., virtual-reality system 2100 in FIG. 21). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 19:
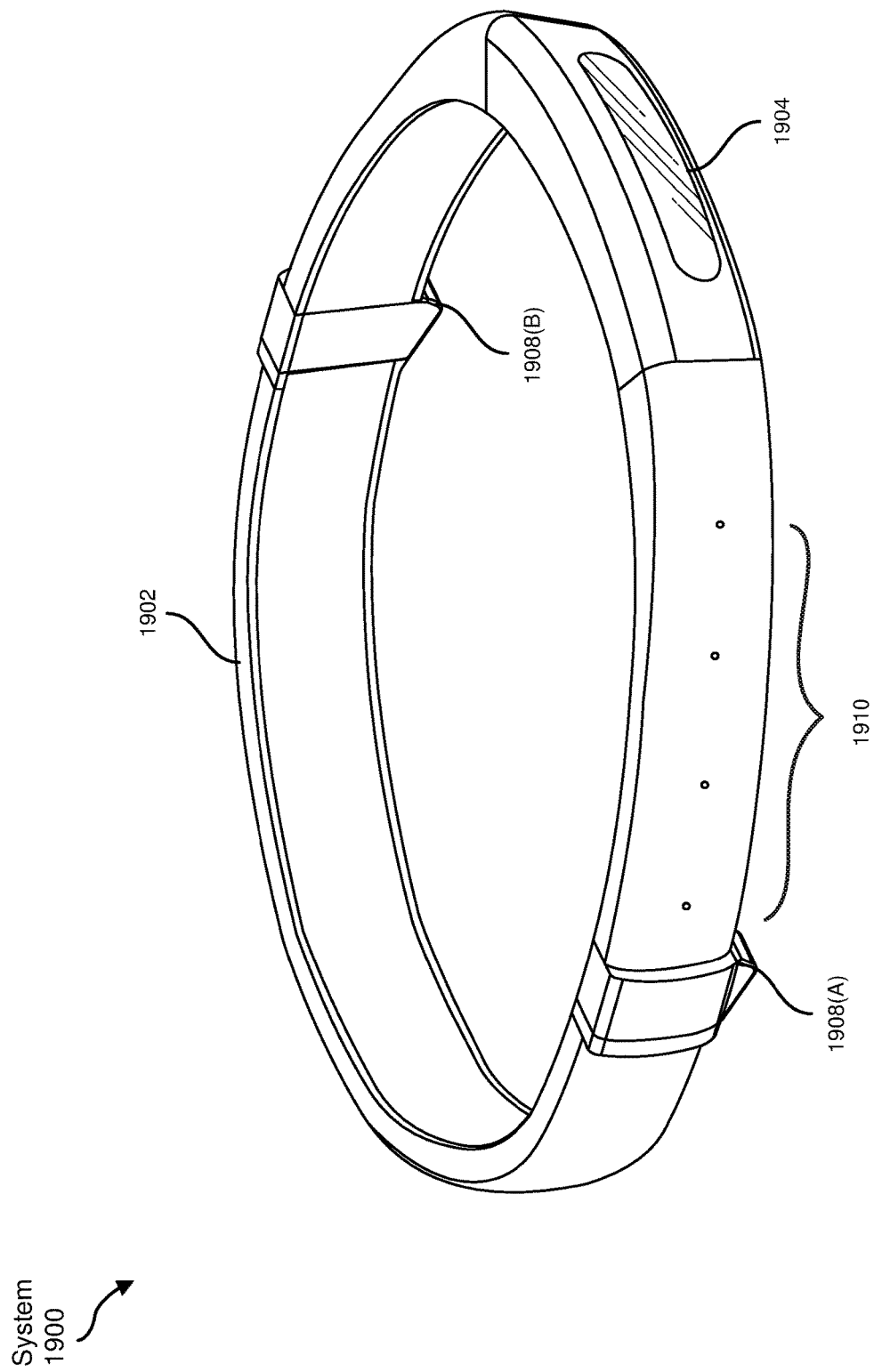
FIG. 19 illustrates an exemplary artificial-reality headband that may be used in connection with embodiments of this disclosure.

Turning to FIG. 19, augmented-reality system 1900 generally represents a wearable device dimensioned to fit about a body part (e.g., a head) of a user. As shown in FIG. 19, system 1900 may include a frame 1902 and a camera assembly 1904 that is coupled to frame 1902 and configured to gather information about a local environment by observing the local environment. Augmented-reality system 1900 may also include one or more audio devices, such as output audio transducers 1908(A) and 1908(B) and input audio transducers 1910. Output audio transducers 1908(A) and 1908(B) may provide audio feedback and/or content to a user, and input audio transducers 1910 may capture audio in a user's environment.

As shown, augmented-reality system 1900 may not necessarily include an NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 1900 may not include an NED, augmented-reality system 1900 may include other types of screens or visual feedback devices (e.g., a display screen integrated into a side of frame 1902).

Figure 20:
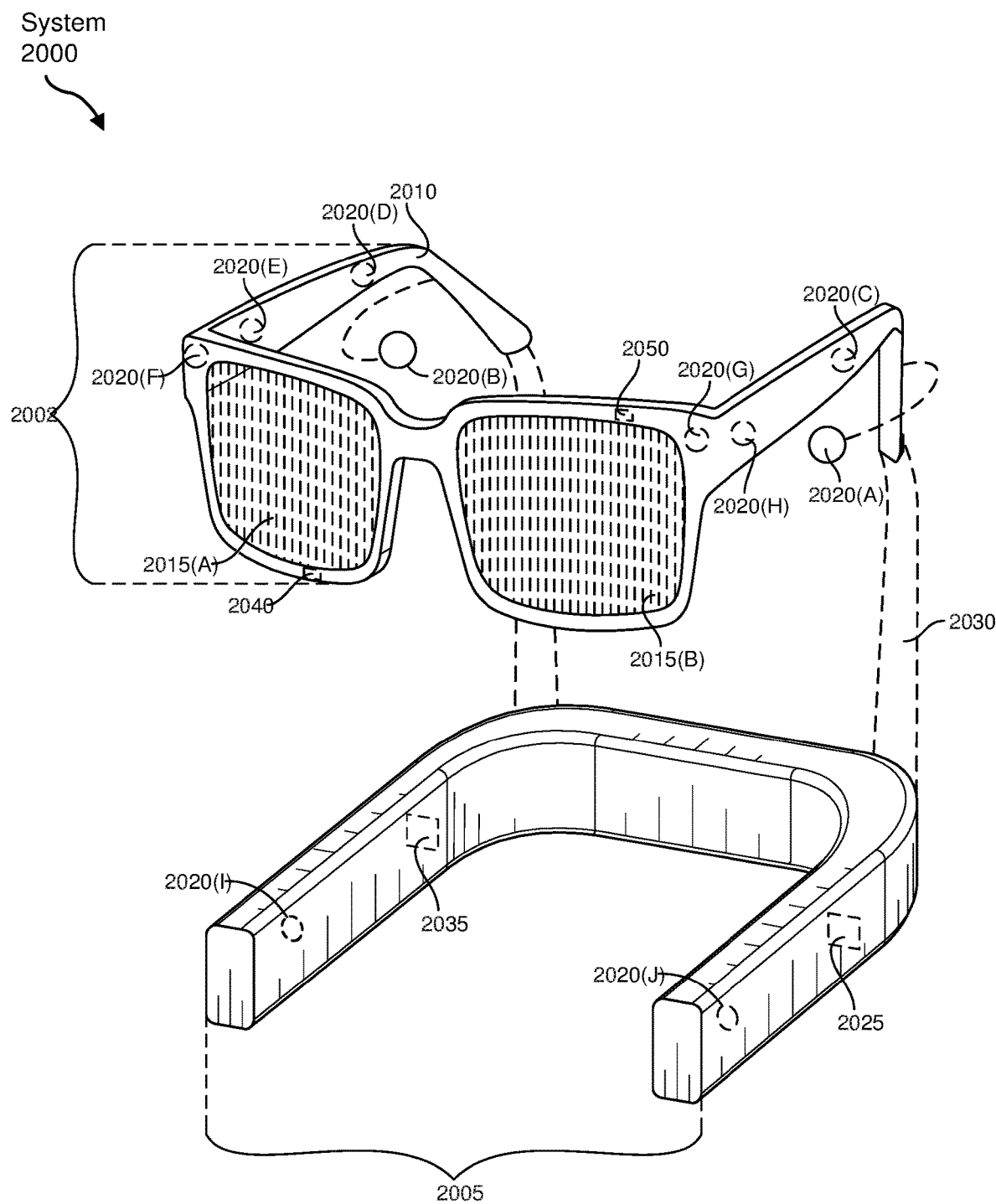
FIG. 20 illustrates exemplary augmented-reality glasses that may be used in connection with embodiments of this disclosure.

The embodiments discussed in this disclosure may also be implemented in augmented-reality systems that include one or more NEDs. For example, as shown in FIG. 20, augmented-reality system 2000 may include an eyewear device 2002 with a frame 2010 configured to hold a left display device 2015(A) and a right display device 2015(B) in front of a user's eyes. Display devices 2015(A) and 2015(B) may act together or independently to present an image or series of images to a user. While augmented-reality system 2000 includes two displays, embodiments of this disclosure may be implemented in augmented-reality systems with a single NED or more than two NEDs.

In some embodiments, augmented-reality system 2000 may include one or more sensors, such as sensor 2040. Sensor 2040 may generate measurement signals in response to motion of augmented-reality system 2000 and may be located on substantially any portion of frame 2010. Sensor 2040 may represent a position sensor, an inertial measurement unit (IMU), a depth camera assembly, or any combination thereof. In some embodiments, augmented-reality system 2000 may or may not include sensor 2040 or may include more than one sensor. In embodiments in which sensor 2040 includes an IMU, the IMU may generate calibration data based on measurement signals from sensor 2040. Examples of sensor 2040 may include, without limitation, accelerometers, gyroscopes, magnetometers, other suitable types of sensors that detect motion, sensors used for error correction of the IMU, or some combination thereof.

Augmented-reality system 2000 may also include a microphone array with a plurality of acoustic transducers 2020(A)-2020(J), referred to collectively as acoustic transducers 2020. Acoustic transducers 2020 may be transducers that detect air pressure variations induced by sound waves. Each acoustic transducer 2020 may be configured to detect sound and convert the detected sound into an electronic format (e.g., an analog or digital format). The microphone array in FIG. 2 may include, for example, ten acoustic transducers: 2020(A) and 2020(B), which may be designed to be placed inside a corresponding ear of the user, acoustic transducers 2020(C), 2020(D), 2020(E), 2020(F), 2020(G), and 2020(H), which may be positioned at various locations on frame 2010, and/or acoustic transducers 2020(I) and 2020(J), which may be positioned on a corresponding neckband 2005.

In some embodiments, one or more of acoustic transducers 2020(A)-(F) may be used as output transducers (e.g., speakers). For example, acoustic transducers 2020(A) and/or 2020(B) may be earbuds or any other suitable type of headphone or speaker.

The configuration of acoustic transducers 2020 of the microphone array may vary. While augmented-reality system 2000 is shown in FIG. 20 as having ten acoustic transducers 2020, the number of acoustic transducers 2020 may be greater or less than ten. In some embodiments, using higher numbers of acoustic transducers 2020 may increase the amount of audio information collected and/or the sensitivity and accuracy of the audio information. In contrast, using a lower number of acoustic transducers 2020 may decrease the computing power required by an associated controller 2050 to process the collected audio information. In addition, the position of each acoustic transducer 2020 of the microphone array may vary. For example, the position of an acoustic transducer 2020 may include a defined position on the user, a defined coordinate on frame 2010, an orientation associated with each acoustic transducer 2020, or some combination thereof.

Acoustic transducers 2020(A) and 2020(B) may be positioned on different parts of the user's ear, such as behind the pinna or within the auricle or fossa. Or, there may be additional acoustic transducers 2020 on or surrounding the ear in addition to acoustic transducers 2020 inside the ear canal. Having an acoustic transducer 2020 positioned next to an ear canal of a user may enable the microphone array to collect information on how sounds arrive at the ear canal. By positioning at least two of acoustic transducers 2020 on either side of a user's head (e.g., as binaural microphones), augmented-reality device 2000 may simulate binaural hearing and capture a 3D stereo sound field around about a user's head. In some embodiments, acoustic transducers 2020(A) and 2020(B) may be connected to augmented-reality system 2000 via a wired connection 2030, and in other embodiments, acoustic transducers 2020(A) and 2020(B) may be connected to augmented-reality system 2000 via a wireless connection (e.g., a Bluetooth connection). In still other embodiments, acoustic transducers 2020(A) and 2020(B) may not be used at all in conjunction with augmented-reality system 2000.

Acoustic transducers 2020 on frame 2010 may be positioned along the length of the temples, across the bridge, above or below display devices 2015(A) and 2015(B), or some combination thereof. Acoustic transducers 2020 may be oriented such that the microphone array is able to detect sounds in a wide range of directions surrounding the user wearing the augmented-reality system 2000. In some embodiments, an optimization process may be performed during manufacturing of augmented-reality system 2000 to determine relative positioning of each acoustic transducer 2020 in the microphone array.

In some examples, augmented-reality system 2000 may include or be connected to an external device (e.g., a paired device), such as neckband 2005. Neckband 2005 generally represents any type or form of paired device. Thus, the following discussion of neckband 2005 may also apply to various other paired devices, such as charging cases, smart watches, smart phones, wrist bands, other wearable devices, hand-held controllers, tablet computers, laptop computers and other external compute devices, etc.

As shown, neckband 2005 may be coupled to eyewear device 2002 via one or more connectors. The connectors may be wired or wireless and may include electrical and/or non-electrical (e.g., structural) components. In some cases, eyewear device 2002 and neckband 2005 may operate independently without any wired or wireless connection between them. While FIG. 20 illustrates the components of eyewear device 2002 and neckband 2005 in example locations on eyewear device 2002 and neckband 2005, the components may be located elsewhere and/or distributed differently on eyewear device 2002 and/or neckband 2005. In some embodiments, the components of eyewear device 2002 and neckband 2005 may be located on one or more additional peripheral devices paired with eyewear device 2002, neckband 2005, or some combination thereof.

Pairing external devices, such as neckband 2005, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 2000 may be provided by a paired device or shared between a paired device and an eyewear device, thus reducing the weight, heat profile, and form factor of the eyewear device overall while still retaining desired functionality. For example, neckband 2005 may allow components that would otherwise be included on an eyewear device to be included in neckband 2005 since users may tolerate a heavier weight load on their shoulders than they would tolerate on their heads. Neckband 2005 may also have a larger surface area over which to diffuse and disperse heat to the ambient environment. Thus, neckband 2005 may allow for greater battery and computation capacity than might otherwise have been possible on a stand-alone eyewear device. Since weight carried in neckband 2005 may be less invasive to a user than weight carried in eyewear device 2002, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 2005 may be communicatively coupled with eyewear device 2002 and/or to other devices. These other devices may provide certain functions (e.g., tracking, localizing, depth mapping, processing, storage, etc.) to augmented-reality system 2000. In the embodiment of FIG. 20, neckband 2005 may include two acoustic transducers (e.g., 2020(I) and 2020(J)) that are part of the microphone array (or potentially form their own microphone subarray). Neckband 2005 may also include a controller 2025 and a power source 2035.

Acoustic transducers 2020(I) and 2020(J) of neckband 2005 may be configured to detect sound and convert the detected sound into an electronic format (analog or digital). In the embodiment of FIG. 20, acoustic transducers 2020(I) and 2020(J) may be positioned on neckband 2005, thereby increasing the distance between the neckband acoustic transducers 2020(I) and 2020(J) and other acoustic transducers 2020 positioned on eyewear device 2002. In some cases, increasing the distance between acoustic transducers 2020 of the microphone array may improve the accuracy of beamforming performed via the microphone array. For example, if a sound is detected by acoustic transducers 2020(C) and 2020(D) and the distance between acoustic transducers 2020(C) and 2020(D) is greater than, e.g., the distance between acoustic transducers 2020(D) and 2020(E), the determined source location of the detected sound may be more accurate than if the sound had been detected by acoustic transducers 2020(D) and 2020(E).

Controller 2025 of neckband 2005 may process information generated by the sensors on neckband 2005 and/or augmented-reality system 2000. For example, controller 2025 may process information from the microphone array that describes sounds detected by the microphone array. For each detected sound, controller 2025 may perform a direction-of-arrival (DOA) estimation to estimate a direction from which the detected sound arrived at the microphone array. As the microphone array detects sounds, controller 2025 may populate an audio data set with the information. In embodiments in which augmented-reality system 2000 includes an inertial measurement unit, controller 2025 may compute all inertial and spatial calculations from the IMU located on eyewear device 2002. A connector may convey information between augmented-reality system 2000 and neckband 2005 and between augmented-reality system 2000 and controller 2025. The information may be in the form of optical data, electrical data, wireless data, or any other transmittable data form. Moving the processing of information generated by augmented-reality system 2000 to neckband 2005 may reduce weight and heat in eyewear device 2002, making it more comfortable to the user.

Power source 2035 in neckband 2005 may provide power to eyewear device 2002 and/or to neckband 2005. Power source 2035 may include, without limitation, lithium ion batteries, lithium-polymer batteries, primary lithium batteries, alkaline batteries, or any other form of power storage. In some cases, power source 2035 may be a wired power source. Including power source 2035 on neckband 2005 instead of on eyewear device 2002 may help better distribute the weight and heat generated by power source 2035.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 2100 in FIG. 21, that mostly or completely covers a user's field of view. Virtual-reality system 2100 may include a front rigid body 2102 and a band 2104 shaped to fit around a user's head. Virtual-reality system 2100 may also include output audio transducers 2106(A) and 2106(B). Furthermore, while not shown in FIG. 21, front rigid body 2102 may include one or more electronic elements, including one or more electronic displays, one or more inertial measurement units (IMUS), one or more tracking emitters or detectors, and/or any other suitable device or system for creating an artificial reality experience.

Artificial-reality systems may include a variety of types of visual feedback mechanisms. For example, display devices in augmented-reality system 2000 and/or virtual-reality system 2100 may include one or more liquid crystal displays (LCDs), light emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial-reality systems may include one or more projection systems. For example, display devices in augmented-reality system 2000 and/or virtual-reality system 2100 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image projection system.

Artificial-reality systems may also include various types of computer vision components and subsystems. For example, augmented-reality system 1900, augmented-reality system 2000, and/or virtual-reality system 2100 may include one or more optical sensors, such as two-dimensional (2D) or 3D cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIGS. 19 and 21, output audio transducers 1908(A), 1908(B), 2106(A), and 2106(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 1910 may include condenser microphones, dynamic microphones, ribbon microphones, and/or any other type or form of input transducer. In some embodiments, a single transducer may be used for both audio input and audio output.

Figure 21:
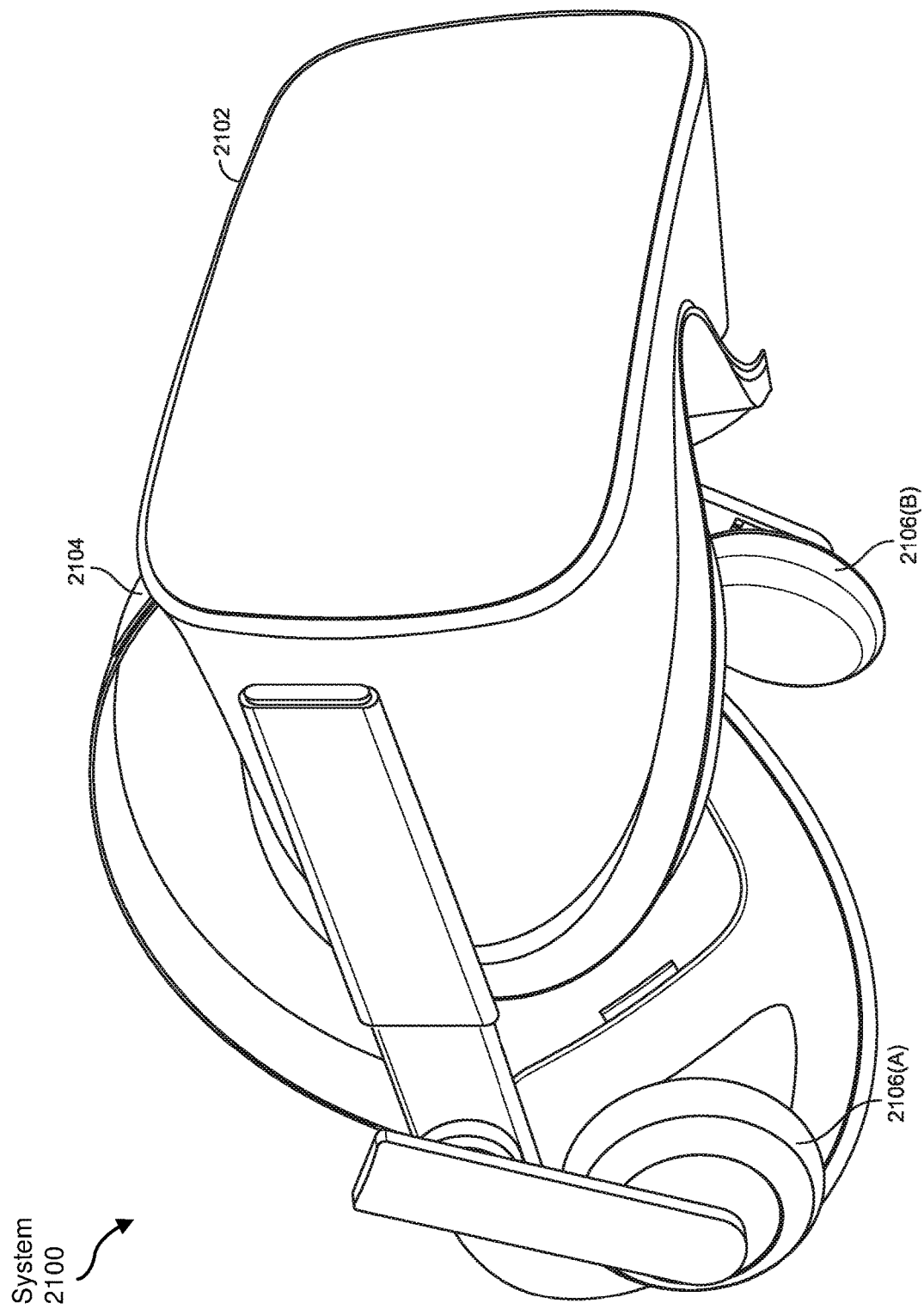
FIG. 21 illustrates an exemplary virtual-reality headset that may be used in connection with embodiments of this disclosure.

While not shown in FIGS. 19-21, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial-reality experience in one or more of these contexts and environments and/or in other contexts and environments.

Some augmented-reality systems may map a user's and/or device's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including WiFi, Bluetooth, global positioning system (GPS), cellular or other communication devices may be also used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. Augmented-reality and virtual-reality devices (such as systems 1900, 2000, and 2100 of FIGS. 19-21, respectively) may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's augmented reality/virtual reality device on demand.

As detailed above, the computing devices and systems described and/or illustrated herein broadly represent any type or form of computing device or system capable of executing computer-readable instructions, such as those contained within the subsystems and/or modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the subsystems and/or modules described and/or illustrated herein may represent portions of a single module or application. In addition, in certain embodiments one or more of these subsystems and/or modules may represent one or more software applications or programs that, when executed by a computing device, may cause the computing device to perform one or more tasks. For example, one or more of the subsystems and/or modules described and/or illustrated herein may represent subsystems and/or modules stored and configured to run on one or more of the computing devices or systems described and/or illustrated herein. One or more of these subsystems and/or modules may also represent all or portions of one or more special-purpose computers configured to perform one or more tasks.

In addition, one or more of the subsystems and/or modules described herein may transform data, physical devices, and/or representations of physical devices from one form to another. For example, one or more of the subsystems and/or modules recited herein may receive or detect a pass-through event involving a real-world object in a user's real-world environment, transform the pass-through event into light-blocking instructions, output a result of the transformation to a light-blocking device that includes a plurality of blocking regions that selectively blocks or transmits light according to the light-blocking instructions, and use the result of the transformation to selectively pass a view of the real-world object through a display device to the user. Additionally or alternatively, one or more of the subsystems and/or modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality, an augmented reality, a mixed reality, a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:
1. A display system, comprising:
  a display element that is transparent and comprises a plurality of pixels that are individually controllable;
  a light-blocking shutter that overlaps at least a portion of a surface of the display element that faces an external environment;
  a display-driving subsystem that:
    displays images visible to a user via display light emitted from one of the plurality of pixels included in the display element during active display intervals, the one of the plurality of pixels being pulsed multiple times within a burst sub-period of consecutive cycle periods; and
    refrains from displaying the images to the user via any of the plurality of pixels included in the display element during inactive display intervals, each of the plurality of pixels remaining inactive within an OFF sub-period of the consecutive cycle periods; and
  a shutter-driving subsystem that:
    alternately switches the light-blocking shutter between a blocking state in which light transmission through the light-blocking shutter is blocked and a pass-through state in which light transmission through the light-blocking shutter is enabled;

maintains the light-blocking shutter in the blocking state during the entirety of the burst sub-period in which the one of the plurality of pixels is pulsed multiple times; and maintains the light-blocking shutter in the pass-through state during the entirety of the OFF sub-period in which each of the plurality of pixels remains inactive; and wherein each of the consecutive cycle periods consists of the burst sub-period and the OFF sub-period.

2. The display system of claim 1, wherein the shutter-driving subsystem maintains the light-blocking shutter in the blocking state during the entirety of each of the active display intervals that occur within the burst sub-period.

3. The display system of claim 1, wherein the shutter-driving subsystem maintains the light-blocking shutter in the blocking state during at least one of the inactive display intervals that occurs within the burst sub-period.

4. The display system of claim 1, wherein each of the active display intervals has a duration between approximately 0.1% and approximately 50% of the total duration of each of the consecutive cycle periods.

5. The display system of claim 1, wherein the burst sub-period has a duration between approximately 0.00001% and approximately 30% of the total duration of each of the consecutive cycle periods.

6. The display system of claim 1, wherein the light-blocking shutter comprises one light-blocking region or multiple light-blocking regions that are individually operable in response to signals from the shutter-driving subsystem.

7. The display system of claim 1, wherein the light-blocking shutter comprises at least one of a liquid crystal shutter or a mechanical shutter, the light blocking being accomplished by absorption, reflection or scattering of the light.

8. The display system of claim 7, wherein the light-blocking shutter further comprises an additional shutter layer comprising an electrochromic material that is selectively transmissive.

9. The display system of claim 1, wherein the display element comprises at least one of a waveguide or an optical combiner.

10. The display system of claim 1, wherein:
the display element further comprises a pass-through region through which light from the external environment is transmitted at least when the light-blocking shutter is in the pass-through state; and
the shutter-driving subsystem drives the light-blocking shutter to block light transmission through a light-blocking region of the light-blocking shutter overlapping at least a portion of the pass-through region of the display element.

11. The display system of claim 10, wherein the light-blocking region substantially or entirely overlaps the pass-through region of the display element.

12. The display system of claim 10, wherein:
the light-blocking region overlaps a selected portion of the pass-through region of the display element so as to block externally-directed light from at least one of a light-emitting region of the display element or a portion of the user's face illuminated by the display light; and
the light-blocking region does not overlap a surrounding portion of the pass-through region of the display element outside of the selected portion.

13. The display system of claim 12, wherein the shutter-driving subsystem drives the light-blocking shutter to block light transmission through a surrounding region of the light-blocking shutter outside of the light-blocking region to a lesser extent than the light-blocking region.

14. A head-mounted display device, comprising:
an optical subsystem that provides a user with composite views of displayed images and an external environment, the optical subsystem comprising:
a transparent display element that comprises a plurality of pixels that are individually controllable; and
a light-blocking shutter that overlaps at least a portion of a surface of the transparent display element that faces the external environment;
a display-driving subsystem that:
displays images visible to the user via display light emitted from one of the plurality of pixels included in the transparent display element during active display intervals, the one of the plurality of pixels being pulsed multiple times within a burst sub-period of consecutive cycle periods; and
refrains from displaying the images to the user via any of the plurality of pixels included in the transparent display element during inactive display intervals, each of the plurality of pixels remaining inactive within an OFF sub-period of the consecutive cycle periods; and
a shutter-driving subsystem that:
alternately switches the light-blocking shutter between a blocking state in which light transmission through the light-blocking shutter is blocked and a pass-through state in which light transmission through the light-blocking shutter is enabled;
maintains the light-blocking shutter in the blocking state during the entirety of the burst sub-period in which the one of the plurality of pixels is pulsed multiple times; and
maintains the light-blocking shutter in the pass-through state during the entirety of the OFF sub-period in which each of the plurality of pixels remains inactive; and
wherein each of the consecutive cycle periods consists of the burst sub-period and the OFF sub-period.

15. A computer-implemented method, comprising:
displaying images visible to a user via display light emitted from one of a plurality of pixels included in a display element during active display intervals, wherein:
the display element is transparent;
the plurality of pixels are individually controllable; and
the one of the plurality of pixels is pulsed multiple times within a burst sub-period of consecutive cycle periods;
refraining from displaying the images to the user via any of the plurality of pixels included in the display element during inactive display intervals, each of the plurality of pixels remaining inactive within an OFF sub-period of the consecutive cycle periods;
alternately switching a light-blocking shutter between a blocking state in which light transmission through the light-blocking shutter is blocked and a pass-through state in which light transmission through the light-blocking shutter is enabled;
maintaining the light-blocking shutter in the blocking state during the entirety of the burst sub-period in which the one of the plurality of pixels is pulsed multiple times; and maintaining the light-blocking shutter in the pass-through state during the entirety of the OFF sub-period in which each of the plurality of pixels remains inactive; and wherein each of the consecutive cycle periods consists of the burst sub-period and the OFF sub-period.

16. The computer-implemented method of claim 15, wherein maintaining the light-blocking shutter in the blocking state during the entirety of the burst sub-period comprises blocking light transmission through the light-blocking shutter during the entirety of each of the active display intervals that occur within the burst sub-period.

17. The computer-implemented method of claim 15, further comprising blocking light transmission through the light-blocking shutter during at least one of the inactive display intervals that occurs within the burst sub-period.

* * * * *